(12) United States Patent
Tang et al.

(10) Patent No.: US 9,848,429 B2
(45) Date of Patent: *Dec. 19, 2017

(54) METHOD, APPARATUS AND SYSTEM FOR BEARING CIRCUIT SWITCHED DOMAIN SERVICE DATA OVER RADIO BEARER

(75) Inventors: Zongquan Tang, Shanghai (CN); Xinfa Wang, Shanghai (CN); Jiancheng Du, Plano, TX (US); Li Chen, Shanghai (CN); Xialing Liu, Shanghai (CN); Limin Xia, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/273,820

(22) Filed: Oct. 14, 2011

(65) Prior Publication Data

US 2012/0033635 A1 Feb. 9, 2012

Related U.S. Application Data

(63) Continuation of application No. 12/648,627, filed on Dec. 29, 2009, which is a continuation of application No. PCT/CN2008/071833, filed on Jul. 31, 2008.

(30) Foreign Application Priority Data

Aug. 1, 2007 (CN) .......................... 2007 1 0143474
Sep. 30, 2007 (CN) .......................... 2007 1 0162758

(51) Int. Cl.
*G01R 31/08* (2006.01)
*H04W 72/04* (2009.01)
(Continued)

(52) U.S. Cl.
CPC ........ *H04W 72/0493* (2013.01); *H04W 28/18* (2013.01); *H04W 88/06* (2013.01)

(58) Field of Classification Search
CPC ........ H04W 72/04; H04W 52/02; H04W 4/00
See application file for complete search history.

(56) References Cited

U.S. PATENT DOCUMENTS 6,385,179 B1 5/2002 Malcolm et al.
7,756,050 B2 7/2010 Conner et al.
(Continued)

FOREIGN PATENT DOCUMENTS

CN 1658545 A 8/2005
CN 1871804 A 11/2006
(Continued)

OTHER PUBLICATIONS

Holma, H., et al., "VOIP over HSPA with 3GPP Release 7" The 17th Annual IEEE International Symposium on Personal, Indoor and Mobile Radio Communications (PIMRC '06), Sep. 11-14, 2006, pp. 1-5, XP 31023407A, IEEE, Helsinki, Finland.
(Continued)

*Primary Examiner* — Anez Ebrahim
(74) *Attorney, Agent, or Firm* — Leydig, Voit & Mayer, Ltd.

(57) ABSTRACT

A method for bearing CS-domain service data over radio bearer is disclosed. The method includes: letting CS-domain service data be borne over a radio high-speed packet data access channel according to a channel mapping relation between CS-domain service data and the radio high-speed packet data access channel. An apparatus and a system are also provided herein.

21 Claims, 11 Drawing Sheets

(51) Int. Cl.
*H04W 28/18* (2009.01)
*H04W 88/06* (2009.01)

(52) U.S. Cl.
USPC .......... 370/329; 370/328; 370/310; 370/356; 455/450; 455/464; 455/509

(56) References Cited

U.S. PATENT DOCUMENTS

| | | | |
|---|---|---|---|
| 2001/0015968 | A1 | 8/2001 | Sicher |
| 2001/0034228 | A1* | 10/2001 | Lehtovirta et al. ........... 455/424 |
| 2003/0045288 | A1 | 3/2003 | Luschi et al. |
| 2003/0142648 | A1* | 7/2003 | Semper .......... 370/331 |
| 2005/0020260 | A1 | 1/2005 | Jeong |
| 2005/0070262 | A1 | 3/2005 | Weigand |
| 2005/0147040 | A1* | 7/2005 | Vayanos et al. ............ 370/235 |
| 2005/0185608 | A1 | 8/2005 | Lee et al. |
| 2005/0226227 | A1* | 10/2005 | Kim et al. .................. 370/352 |
| 2005/0265299 | A1 | 12/2005 | Franceschini |
| 2005/0286475 | A1* | 12/2005 | Ahmavaara .................. 370/335 |
| 2006/0018294 | A1 | 1/2006 | Kynaslahti et al. |
| 2006/0039326 | A1* | 2/2006 | Jeong et al. .................. 370/329 |
| 2006/0067324 | A1 | 3/2006 | Kim et al. |
| 2006/0203780 | A1 | 9/2006 | Terry |
| 2006/0245417 | A1* | 11/2006 | Conner et al. ................ 370/352 |
| 2007/0117519 | A1 | 5/2007 | Terry |
| 2007/0133458 | A1* | 6/2007 | Chandra et al. ............. 370/329 |
| 2007/0177573 | A1 | 8/2007 | Xu |
| 2008/0020775 | A1 | 1/2008 | Willars |
| 2008/0026752 | A1 | 1/2008 | Flore |
| 2008/0037474 | A1* | 2/2008 | Niwano ......................... 370/335 |
| 2008/0040215 | A1 | 2/2008 | Huang et al. |
| 2008/0049669 | A1* | 2/2008 | Lundby et al. ............... 370/329 |
| 2008/0085719 | A1 | 4/2008 | Kuchibhotla |
| 2008/0123660 | A1 | 5/2008 | Sammour |
| 2008/0123831 | A1 | 5/2008 | Flensted-Jensen et al. |
| 2008/0144600 | A1 | 6/2008 | Anderson |
| 2008/0232331 | A1 | 9/2008 | Ueda |
| 2010/0103899 | A1* | 4/2010 | Kwak et al. ................. 370/329 |
| 2010/0157908 | A1 | 6/2010 | Roberts |
| 2014/0133468 | A1 | 5/2014 | Niwano |

FOREIGN PATENT DOCUMENTS

| | | |
|---|---|---|
| CN | 1874328 A | 12/2006 |
| CN | 1934890 A | 3/2007 |
| CN | 1993965 A | 7/2007 |
| CN | 101019344 A | 8/2007 |
| CN | 101091359 A | 12/2007 |
| CN | 101167293 A | 4/2008 |
| EP | 1182900 A1 | 2/2002 |
| EP | 1 732 342 A1 | 12/2006 |
| GB | 2429374 A | 2/2007 |
| KR | 10-2008-0012274 | 2/2008 |
| WO | WO 01/39442 A1 | 5/2001 |
| WO | 2005048623 A1 | 5/2005 |
| WO | WO 2005/091668 A1 | 9/2005 |
| WO | 2006027834 A1 | 3/2006 |
| WO | WO 2006/071155 A1 | 7/2006 |
| WO | WO 2006/118738 A1 | 11/2006 |

OTHER PUBLICATIONS

NSN, Nokia, "Supporting CS over HSPA," 3GPP TSG-RAN WG2 Meeting #59, Agenda item 7.5.15, Aug. 20-24, 2007, 2 pages, R2-073487, Athens, Greece.
English Translation of the Written Opinion of the International Searching Authority, PCT/CN2008/071833, Date of mailing: Nov. 13, 2008, 3 pages.
Supplementary European Search Report, Application No. 08783826.4-2412 / 2175672, PCT/CN2008/071833, Sep. 7, 2010, 15 pages.
International Search Report, PCT/CN2008/071833, dated Nov. 13, 2008, 4 pages.
First office action of corresponding U.S. Appl. No. 12/648,627, mailed on Mar. 21, 2012, 11 pages total.
First office action of corresponding European Patent Application No. 08783826.4, mailed on Jan. 23, 2012, 7 pages total.
Office action issued in corresponding U.S. Appl. No. 12/648,627, dated Oct. 11, 2012, total 28 pages.
1$^{st}$ Office Action in corresponding U.S. Appl. No. 14/539,663 (dated Jul. 29, 2016).
Notice of Allowance in corresponding U.S. Appl. No. 14/539,663 (dated Nov. 22, 2016).
3GPP TS 25.301 V7.2.0, 3rd Generation Partnership Project; Technical Specification Group Radio Access Network; Radio Interface Protocol Architecture (Release 7), Jun. 2007, total 48 pages.
3GPP TS 25.306 V7.4.0, 3rd Generation Partnership Project; Technical Specification Group Radio Access Network; UE Radio Access capabilities (Release 7), Jun. 2007, total 43 pages.
3GPP TS 25.308 V7.3.0, 3rd Generation Partnership Project; Technical Specification Group Radio Access Network; High Speed Downlink Packet Access (HSDPA); Overall description; Stage 2 (Release 7), Jun. 2007, total 47 pages.
3GPP TS 25.309 V6.6.0, 3rd Generation Partnership Project; Technical Specification Group Radio Access Network; FDD Enhanced Uplink; Overall description; Stage 2 (Release 6), Mar. 2006, total 34 pages.
3GPP TS 25.323 V7.5.0, 3rd Generation Partnership Project; Technical Specification Group Radio Access Network; Packet Data Convergence Protocol (PDCP) specification (Release 7), Jun. 2007, total 41 pages.
3GPP TS 25.331 Version7.5.0, Jun. 2007, total 1429 pages.
3GPP TS 25.413 V7.6.0, 3rd Generation Partnership Project; Technical Specification Group Radio Access Network; UTRAN Iu interface RANAP signalling (Release 7), Jun. 2007, total 359 pages.
3GPP TS 25.415 V7.3.0, 3rd Generation Partnership Project; Technical Specification Group Radio Access Network; UTRAN Iu interface user plane protocols (Release 7), Dec. 2006, total 64 pages.
3GPP TS 25.433 V7.5.0, 3rd Generation Partnership Project; Technical Specification Group Radio Access Network; UTRAN Iub interface Node B Application Part (NBAP) signalling (Release 7), Jun. 2007, total 939 pages.
3GPP TS 34.108 Version 7.1.0, Jun. 2007, total 285 pages.

\* cited by examiner

METHOD, APPARATUS AND SYSTEM FOR BEARING CIRCUIT SWITCHED DOMAIN SERVICE DATA OVER RADIO BEARER

This application is a continuation of U.S. patent application Ser. No. 12/648,627, filed on Dec. 29, 2009, which is a continuation of International Patent Application No. PCT/CN2008/071833, filed on Jul. 31, 2008. The International Patent Application claims priority to Chinese Patent Application No. 200710143474.1, filed on Aug. 1, 2007, and Chinese Patent Application No. 200710162758.5, filed on Sep. 30, 2007, all of which are hereby incorporated by reference in their entireties.

TECHNICAL FIELD

The present invention relates to the wireless communication field, and in particular, to a method, an apparatus, and a system for bearing Circuit Switched (CS) domain service data over radio bearer.

BACKGROUND

The existing wireless communication system network includes three parts: a radio User Equipment (UE), an access network, and a core network. The core network includes two function domains: CS domain, and Packet Switched (PS) domain, which are responsible for service logic processing, mobility management, and authentication encryption. The access network is responsible for wireless access processing for the user.

Taking the Universal Mobile Telecommunications System (UMTS) as an example, the UMTS Terrestrial Radio Access Network (UTRAN) is one of the typical access network types, and includes a Radio Network Controller (RNC) and a Node B. A UE is connected with a UTRAN through a Uu interface. The UE interacts with the network device through the Uu interface, and provides the user with CS-domain and PS-domain service functions, including speech service, videophone service, and facsimile service.

The Uu interface is divided into three protocol layers: physical layer, namely, layer 1 (L1); data link layer, namely, layer 2 (L2), and network layer, namely, layer 3 (L3). The L2 further includes: Media Access Control (MAC) layer, Radio Link Control (RLC) layer, Packet Data Convergence Protocol (PDCP) layer, and Broadcast Multicast Control (BMC) layer. The L3 and the RLC layer are divided into a Control Plane (C-plane) and a User Plane (U-plane). The PDCP and the BMC exist only on the U-plane. Protocol entities communicate with each other through a Service Access Point (SAP). The lower-layer protocol entities provide services for the upper-layer protocol entities. The L2 provides services for the L3 through a Radio Bearer (RB). The PDCP layer is applicable only to the PS domain to perform header compression and decompression. The MAC layer provides services for the RLC layer through a logical channel. The L1 provides services for the MAC layer through a transmission channel. A certain mapping relation exists between the protocol layers of the Uu interface. Each layer of protocol entity determines the channel mapping relation between the protocol entity and the lower-layer protocol entity through channel configuration parameters. The channel configuration parameters include the type and identifier of the lower-layer channel. The service data transmitted on the Uu interface is encapsulated by the protocol entity on each layer according to the channel mapping relation, and finally forms a data frame for transmission.

The services transmitted on the Uu interface include: speech service, videophone service, and facsimile service. Taking the speech service as an example, the speech service transmitted on the Uu interface may be one of a CS-domain speech service and a PS-domain speech service. On the transmission channel, the CS-domain speech service may be borne by a Dedicated Channel (DCH). When the speech service is encoded through Adaptive Multi-Rate (AMR) or AMR WideBand (AMR-WB), each speech frame includes three substreams A, B, and C. With respect to importance, A is greater than B, and B is greater than C. On the Uu interface, an independent RB needs to be created for each substream based on the requirements of the AMR/AMR-WB codec. Each substream corresponds to an RB. All data over RBs are encapsulated through an RLC. The logical channel here is a Dedicated Traffic Channel (DTCH). Each DTCH is mapped to a transmission channel. The transmission channel here is a DCH. Finally, the DCH is mapped to the Physical Channel (PCH). The PCH here is a Dedicated Physical Channel (DPCH).

On the transmission channel, the PS-domain speech service may be borne over a DCH, or borne through a High Speed Packet Access (HSPA) technology. The HSPA includes a High Speed Downlink Packet Access (HSDPA) and a High Speed Uplink Packet Access (HSUDA). The HSPA technology improves the link transmission rate, network capacity, and spectrum utilization ratio. The transmission channel introduced by the HSDPA is an HSDPA Downlink Shared Channel (HS-DSCH). The physical channel introduced by the HSUDA is an Enhanced Dedicated Channel (E-DCH), and the physical channel introduced by it is an Enhanced Dedicated Physical Data Channel (E-DPDCH).

In the process of developing the present invention, the inventor finds at least the following defects in the related art.

The traditional CS-domain services are technically mature, and the QoS of the services is ensured, but the spectrum efficiency is not high. The HSPA technology is an emerging RB mode, and can enhance the network capacity and spectrum efficiency. However, the existing standard system expressly restricts the HSPA technology from being applied to the CS-domain services. The $3^{rd}$ Generation Partnership Project (3GPP) protocol expressly stipulates that: The HSPA technology is applicable only to bearing PS-domain services, and not applicable to bearing CS-domain services. The 3GPP2 also stipulates similarly. Such a restriction makes it impossible to combine the CS-domain service with the merits of the HSPA technology in the existing wireless networks, or to improve the efficiency of bearing the CS-domain services over radio bearer while ensuring the QoS of the services.

SUMMARY OF THE INVENTION

The embodiments of the present invention provide a method for bearing CS-domain service data over radio bearer. The method lets the CS-domain services be borne over a radio high-speed packet data access channel, thus improving the efficiency of bearing the CS-domain service data over radio bearer while ensuring the QoS of the service.

The embodiments of the present invention provide a radio network node, which lets the CS-domain services data be borne over a radio high-speed packet data access channel, thus improving the efficiency of bearing the CS-domain service data over radio bearer while ensuring the QoS of the service.

The embodiments of the present invention provide a radio UE, which lets the CS-domain services be borne over a radio high-speed packet data access channel, thus improving the efficiency of bearing the CS-domain service data over radio bearer while ensuring the QoS of the service.

The embodiments of the present invention provide a system for bearing CS-domain service data on a radio bearer. The system lets the CS-domain services be borne over a radio high-speed packet data access channel, thus improving the efficiency of bearing the CS-domain service data over radio bearer while ensuring the QoS of the service.

The technical solution under the present invention is implemented in the following way.

A method for bearing CS-domain service data over radio bearer includes bearing CS-domain service data over a radio high-speed packet data access channel according to a channel mapping relation between the CS-domain service data and the radio high-speed packet data access channel.

A radio network node includes a bearer unit that is configured to bear CS-domain service data over a radio high-speed packet data access channel according to a channel mapping relation between the CS-domain service data and the radio high-speed packet data access channel.

A radio UE includes a bearer unit that is configured to bear CS-domain service data over a radio high-speed packet data access channel according to a channel mapping relation between the CS-domain service data and the radio high-speed packet data access channel.

A system for bearing CS-domain service data over radio bearer includes a radio network node and a radio UE.

The radio network node includes a first bearer unit that is configured to bear CS-domain service data over a radio high-speed downlink packet data access channel according to a channel mapping relation between the CS-domain service data and the radio high-speed packet data access channel in the downlink direction.

The radio UE includes a second bearer unit that is configured to bear CS-domain service data over a radio high-speed uplink packet data access channel according to a channel mapping relation between the CS-domain service data and the radio high-speed packet data access channel in the uplink direction.

Therefore, through the method, radio network node, radio UE, and system disclosed herein, the bearer of the CS-domain service data is extended to the radio high-speed packet data access channel according to the channel mapping relation between the CS-domain service data and the radio high-speed packet data access channel. The high QoS assurance of the CS-domain service is combined with the high data throughput of the high-speed packet data access system, and the efficiency of bearing CS-domain service data over radio bearer is improved while the QoS of the services is ensured.

DETAILED DESCRIPTION OF ILLUSTRATIVE EMBODIMENTS

Figure 1:
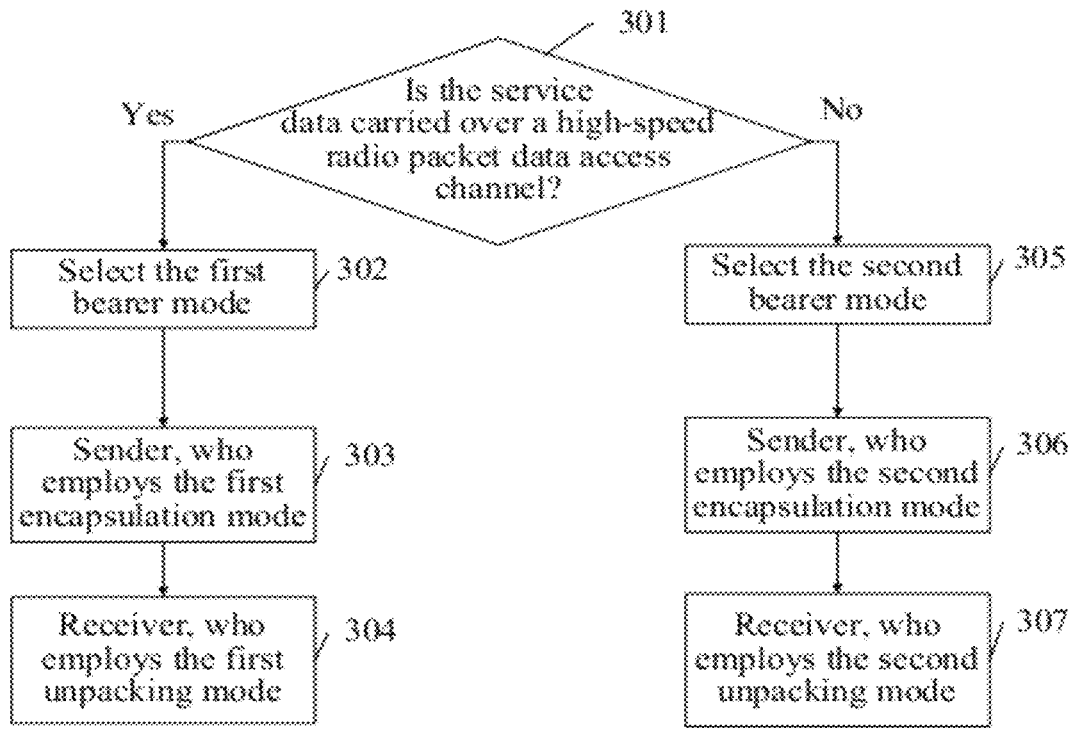
FIG. 1 is a simplified schematic diagram illustrating a method for bearing CS-domain service data in an embodiment of the present invention.

In the related art, the radio high-speed packet data access technology is applicable only to bearing PS-domain service data, and not applicable to bearing CS-domain service data. Therefore, in the embodiments of the present invention, a channel mapping relation between the CS-domain service data and the radio high-speed packet data access channel is configured. It is understandable that the channel mapping relation may be defined by the mobile communication system and standard, namely, preconfigured by the system or standard protocol. However, in some scenarios, the channel mapping relation may also be configured by a node that executes the control function in the network, for example, RNC in a WCDMA system, Base Station Controller (BSC) in a CDMA system, or an evolved Node B (eNodeB) in a System Architecture Evolution/Long Term Evolution (SAE/LTE) system, or an enhanced basestation in an HSPA+. After the channel mapping relation is defined or configured beforehand, the network and the UE may let the CS-domain service data be borne on the radio high-speed packet data access channel according to the channel mapping relation, and encapsulate the CS-domain service data into a data frame of the radio high-speed packet data access channel. It is understandable that the channel mapping relation may be modified manually through a Man-Machine Language (MML) command so that the CS-domain service borne over the non-radio high-speed packet data access channel is shifted to the radio high-speed packet data access channel directly. The channel corresponding to the radio high-speed packet data access technology is called a radio high-speed packet data access channel.

The channel mapping relation and the channel configuration parameter above describe the same issue from different perspectives. "Channel mapping relation" emphasizes the mapping between the upper layer and the lower layer, and the "channel configuration parameter" emphasizes the configuration parameters of each layer. For example, for a logical channel, a parameter is used for defining the type and identifier of its lower-layer transmission channel. For this logical channel, the type and identifier of the transmission channel are channel configuration parameters, but such channel configuration parameters reflect the mapping between the logical channel and the transmission channel. For a service such as speech service, the same preconfigured channel configuration parameters are used on every occasion of setting up the speech service. The technical solution under the present invention is described herein from the perspective of the channel mapping relation.

In another embodiment of the present invention, the radio high-speed packet data access mentioned herein is an HSPA/HSPA+ in a WCDMA system or Time Division-Synchronous Code Division Multiple Access (TD-SCDMA) system, and is a High Rate Packet Data/Data Only (HRPD/DO) in a CDMA system, and may have other names in other communication fields. The evolved network and LTE also involve the radio high-speed packet data access technology. Moreover, the HSPA+ is an enhancement based on the HSPA.

Taking the UMTS as an example, the technical solution under the present invention is described below.

In the technical solution under the present invention, the CS-domain service data is borne over a radio high-speed packet data access channel, thus improving the efficiency of bearing the CS-domain service data over radio bearer while ensuring the QoS of the service.

The embodiments of the present invention involve two RB modes of the CS-domain service: a first bearer mode, and a second bearer mode. In the first bearer mode, data is transmitted over a radio high-speed packet data access channel, to improve the CS-domain service capacity of the radio network and ensure the QoS. The second bearer mode is the existing network CS-domain service bearer mode; in the second bearer mode, data is transmitted over a non high-speed packet data access channel. The embodiments of the present invention put emphasis on the first bearer mode, and extend the second bearer mode in order to be compatible with the existing radio technology.

The RB channel of the CS-domain service is selected according to current network capability, UE capability, and load. If the CS-domain service is borne over the radio high-speed packet data access channel, it is the first bearer mode; otherwise, it is the second bearer mode.

After the RB channel is set up, working mode of the service may be changed, for example, code mode change, rate change, and service type change, but the radio bearer channel remains unchanged.

The embodiments of the present invention provide a solution in the case that the bearer channel changes in the communication process, for example, in the case that the service data is shifted from a radio high-speed packet data access channel to a non high-speed packet data access channel.

In order to transmit CS-domain services over the radio high-speed packet data access channel, the encapsulation mode of the CS-domain service data packet (namely, the first encapsulation mode) needs to be defined. The CS-domain service data is mapped to the radio bearer channel frame in the first encapsulation mode from layer to layer. After receiving the data frame at the radio bearer, the receiver unpacks the data frame to recover the CS-domain service data.

As regards the radio network node herein, the radio network node selects a downlink CS-domain service data bearer mode, uses the corresponding encapsulation mode to encapsulate the data packet on the basis of the selected bearer mode, and transmits the data packet over the radio bearer. After receiving the data packet, the radio UE unpacks the data packet to recover the service data.

As regards the radio UE herein, the radio UE selects the uplink CS-domain service bearer mode according to the channel parameter configuration at the network side, encapsulates the data packet in the corresponding encapsulation mode, and transmits the data packet over the radio bearer. After receiving the data packet, the radio network node unpacks the data packet to recover the service data.

An example is given below to describe a process of bearing the CS-domain service data according to the present invention. This process involves bearer judgment. It is understandable that the technical solution under the present invention also allows the CS-domain service data to be borne over the radio high-speed packet data access channel directly. FIG. 1 is a simplified schematic diagram illustrating a method for bearing CS-domain service data in an embodiment of the present invention.

Block 301: A bearing judgment is made about whether the CS-domain service data is borne over a radio high-speed packet data access channel. If the CS-domain service data is borne over the radio high-speed packet data access channel, the process proceeds to step 302; otherwise, the process proceeds to step 305.

Block 302: The first bearer mode is selected and the CS-domain service data is borne over the radio high-speed packet data access channel.

Block 303: A transmitter adopts the first encapsulation mode to encapsulate the CS-domain service data into a data frame of the radio high-speed packet data access channel on the bearer selected in step 302.

Block 304: After receiving the data frame, the receiver adopts the first unpacking mode to unpack the data frame and obtain the CS-domain service data.

Block 305: The second bearer mode is selected and the CS-domain service data is borne over a non high-speed packet data access channel.

Block 306: The transmitter adopts the second encapsulation mode to encapsulate the CS-domain service data into a data frame of the non high-speed packet data access channel on the bearer selected in step 305, and sends the encapsulated data frame out.

Block 307: After receiving the data frame, the receiver adopts the second unpacking mode to unpack the data frame and obtain the CS-domain service data.

In the foregoing process, the working mode of the service may be changed after the RB channel is set up. It is understandable that the step of changing the working mode of the service is optional.

In the foregoing method, if the bearer channel changes in the communication process, the bearer mode may be reselected. It is understandable that this step may occur on more than one occasion in the flowchart of FIG. 1.

The present invention is elaborated below with reference to preferred embodiments.

A first embodiment of the present invention provides a method for bearing CS-domain service data over radio bearer in the uplink direction.

The method includes: bearing CS-domain service data over a radio high-speed packet data access channel according to a first channel mapping relation between CS-domain service data and the radio high-speed packet data access channel, which is known as the first bearer mode described above.

After the CS-domain service data is borne on the radio high-speed packet data access channel, the method further includes: encapsulating the CS-domain service data into a data frame of the radio high-speed uplink packet data access channel in the uplink direction, which is known as the first encapsulation mode. The CS-domain service data is mapped to the radio bearer channel frame in the first encapsulation mode from layer to layer.

CS-domain services include: one of CS-domain speech service, CS-domain video service, CS-domain data service, and CS-domain facsimile. For a different CS-domain service, the first channel mapping relation corresponds to different channel configuration parameters. On a created bearer, the CS-domain service data is encapsulated into a data frame of the radio high-speed uplink packet data access channel.

Figure 2:
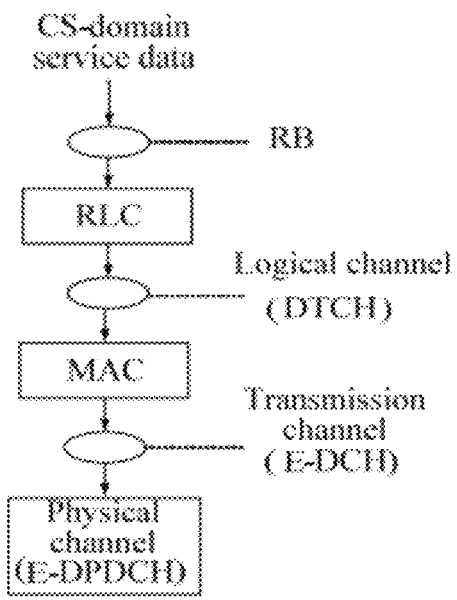
FIG. 2 is a simplified schematic diagram illustrating a channel mapping relation between CS-domain service data and a radio high-speed uplink packet data access channel in the uplink direction in the first embodiment of the present invention.

Specifically, the CS-domain service data is borne over radio bearer, and mapped to the radio high-speed uplink packet data access channel. FIG. 2 is a simplified schematic diagram illustrating a channel mapping relation between CS-domain service data and a radio high-speed uplink packet data access channel in the uplink direction in the first embodiment of the present invention. In the UMTS, the foregoing process is: The data over the RB is encapsulated through an RLC, mapped to a DTCH, and then encapsulated through an MAC. The DTCH is mapped to the E-DCH introduced by the radio high-speed packet data access technology, and finally, the E-DCH is mapped to the E-DPDCH. It is understandable that, although the UMTS is given as an example above, a similar channel mapping relation may be applied in the CDMA system to let the CS-domain service data be borne over the radio high-speed uplink packet data access channel.

In the technical solution provided above, the CS-domain service data is borne over radio bearer. In practice, the CS-domain service data may be borne by other means. For example, each channel of CS-domain service data is borne over radio bearer; or, if the CS-domain service data includes multiple CS-domain service substreams, the multiple substreams may be encapsulated in one special speech frame, and borne over the same RB. For example, a speech service may include multiple CS-domain service substreams, and the multiple substreams may be encapsulated in one special speech frame, and borne over the same RB.

Figure 3:
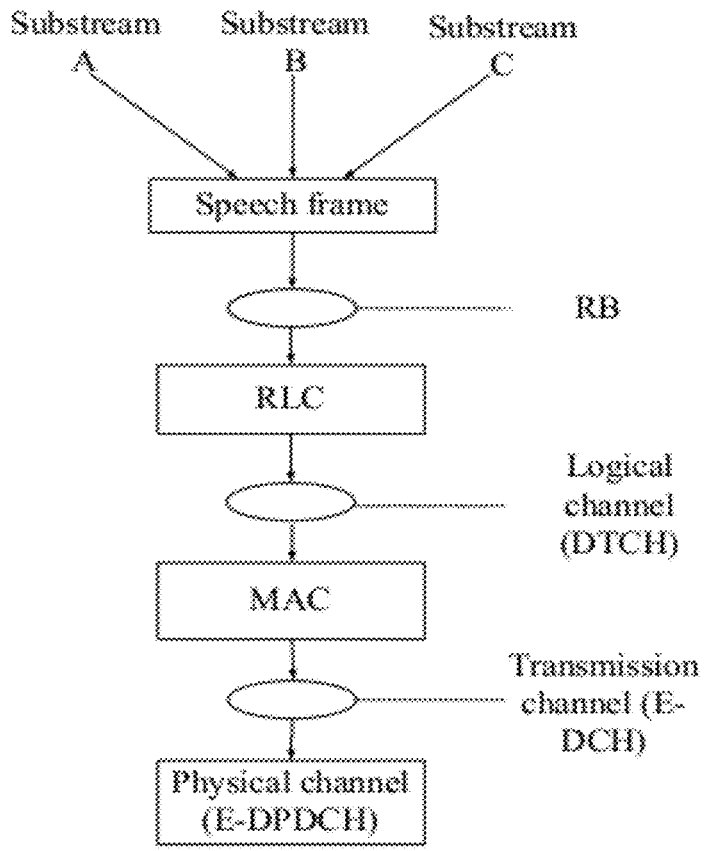
FIG. 3 is a simplified schematic diagram illustrating a channel mapping relation between CS-domain AMR speech service data and a radio high-speed uplink packet data access channel in the uplink direction in the first embodiment of the present invention.

Specially, AMR speech service is given as an example here. For example, three substreams are encapsulated into one special speech frame, and borne over the same RB. FIG. 3 is a simplified schematic diagram illustrating a channel mapping relation between CS-domain AMR speech service data and a radio high-speed uplink packet data access channel in the uplink direction in the first embodiment of the present invention. In the uplink direction, three substreams of the CS-domain AMR speech service data are encapsulated into one special speech frame, borne over one RB channel, and mapped to a DTCH; the DTCH is mapped to the E-DCH introduced by the radio high-speed packet data access technology; and finally, the E-DCH is mapped to the E-DPDCH.

Figure 4:
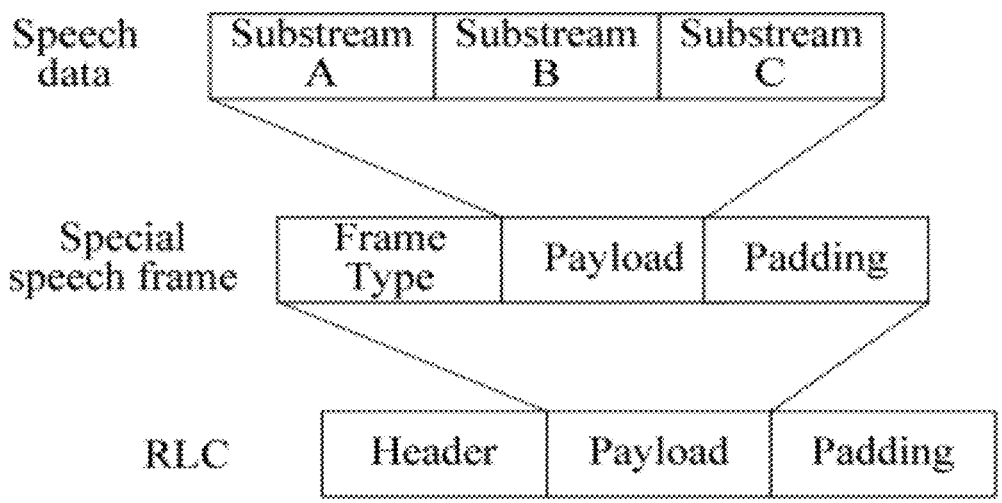
FIG. 4 is a simplified schematic diagram illustrating a structure of a special speech frame in an embodiment of the present invention.

A special speech frame is defined in the foregoing channel mapping relation. FIG. 4 is a simplified schematic diagram illustrating a structure of a special speech frame in an embodiment of the present invention. The special speech frame includes three parts data: Frame Type, Payload, and Padding. The Frame Type has a fixed length such as 1 byte, and represents an AMR/AMR-WB coding mode. The payload is a data made up of three concatenated substreams. The padding is a filler bit. When the frame type and the payload sum are out of alignment against bytes, several bits are used as a padding to make the whole special speech frame aligned against bytes. In the related art, the coding mode of the AMR/AMR-WB is in a one-to-one relation with the speech substream. The channel mapping relation between the AMR coding mode and the speech substream length is shown in Table 1.

TABLE 1

| Substream A | Substream B | Substream C | Frame Type | AMR coding mode |
| --- | --- | --- | --- | --- |
| 81 | 103 | 60 | 8 | 12.20 kbit/s |
| 65 | 99 | 40 | 7 | 10.20 kbit/s |
| 75 | 84 | 0 | 6 | 7.95 kbit/s |
| 61 | 87 | 0 | 5 | 7.40 kbit/s |
| 58 | 76 | 0 | 4 | 6.70 kbit/s |
| 55 | 63 | 0 | 3 | 5.90 kbit/s |
| 49 | 54 | 0 | 2 | 5.15 kbit/s |
| 42 | 53 | 0 | 1 | 4.75 kbit/s |

The channel mapping relation between the AMR-WB coding mode and the speech substream length is shown in Table 2.

TABLE 2

| Substream A | Substream B | Substream C | Frame Type | AMR-WB coding mode |
| --- | --- | --- | --- | --- |
| 72 | 405 | 0 | 8 | 23.85 kbit/s |
| 72 | 389 | 0 | 7 | 23.05 kbit/s |
| 72 | 325 | 0 | 6 | 19.85 kbit/s |
| 72 | 293 | 0 | 5 | 18.25 kbit/s |

TABLE 2-continued

| Substream A | Substream B | Substream C | Frame Type | AMR-WB coding mode |
|---|---|---|---|---|
| 72 | 245 | 0 | 4 | 15.58 kbit/s |
| 72 | 213 | 0 | 3 | 14.25 kbit/s |
| 72 | 181 | 0 | 2 | 12.65 kbit/s |
| 64 | 113 | 0 | 1 | 8.85 kbit/s |
| 54 | 78 | 0 | 0 | 6.6 kbit/s |

The radio UE determines a coding type in the process of setting up a speech service with the network. After the coding type is determined, three substreams may be extracted from the special speech frame according to the channel mapping relation between the coding mode and the speech substream length. For example, as shown in Table 1, if the AMR coding type is adopted, the "Frame Type" in the special speech frame received by the RNC is 7, and it is determined that the lengths of the speech substreams corresponding to the current mode are 65, 99, and 40 respectively. The three substreams may be obtained through unpacking of the frame according to the determined length of the speech substream. The channel mapping relation table above is only an example.

In another embodiment, before the CS-domain service data is encapsulated into a data frame of the radio high-speed uplink packet data access channel, the method may further include a judgment step. The judgment step judges whether the radio high-speed uplink packet data access channel is adopted to bear the CS-domain service data.

Judgment factors may include:

relatively static elements, for example, capabilities of the UE/network in supporting the CS-domain service data borne over a high-speed packet data access channel, user priority (for example, high, average, low), and service type (for example, speech, facsimile, data service, video); and dynamic parameters of the system, for example, current service load percentage of the system on the radio high-speed packet data access channel, and current service load percentage of the system on the non high-speed packet data access channel.

In practice, the judgment algorithm may be configured by the system statically or set dynamically.

For example, the judgment method may include the following.

It is judged whether both the network and the UE support the radio high-speed uplink packet data access channel to bear the CS-domain service data; if both the network and the UE support the radio high-speed uplink packet data access channel to bear the CS-domain service data, a radio high-speed uplink packet data access channel is adopted to bear the CS-domain service data in the uplink direction; if at least one of the network and the UE does not support the radio high-speed uplink packet data access channel to bear the CS-domain service data, a non-radio high-speed packet data access channel is adopted to bear the CS-domain service data in the uplink direction. The supporting of the network may include that, taking the UMTS as an example, the network checks whether the network itself supports the high-speed packet data access channel to bear the CS-domain service data; if the network itself supports the high-speed packet data access channel to bear the CS-domain service data, the network further judges whether the UE supports the high-speed packet data access channel to bear the CS-domain service data.

Besides, if both the network and the UE support the radio high-speed uplink packet data access channel to bear the CS-domain service data, the network judges whether to select the radio high-speed uplink packet data access channel for bearing the CS-domain service data according to the load of the radio high-speed uplink packet data access channel and the load of the non-radio high-speed uplink packet data access channel in the network. For example, the network judges whether both the network and the UE support the radio high-speed uplink packet data access channel to bear the CS-domain service data, considering both the load of the radio high-speed uplink packet data access channel and the load of the non-radio high-speed uplink packet data access channel in the network. For example, if the load of the radio high-speed uplink packet data access channel and the load of the non-radio high-speed uplink packet data access channel meet certain conditions respectively (for example, the load of the radio high-speed uplink packet data access channel is lower than the load of the non-radio high-speed uplink packet data access channel), the radio high-speed uplink packet data access channel is preferred for bearing the CS-domain service data. As mentioned above, the judgment factors are miscellaneous and configured by the system statically dynamically, which is not limited herein.

It is understandable that if the judgment result is that the data is borne over a non high-speed packet data access channel, the channel mapping relation between the CS-domain service and the non high-speed packet data access channel is applicable, and the bearer mode between the CS-domain service and the non high-speed packet data access channel is applicable.

If it is determined that the first bearer mode is adopted, the UE adopts the foregoing channel mapping relation to bear the CS-domain speech service data over the radio high-speed uplink packet data access channel in the uplink direction, encapsulates the data into a data frame of the radio high-speed uplink packet data access channel on this bearer, and sends the encapsulated data frame out. After receiving the data frame, the network unpacks the data frame to recover the CS-domain service data.

Through the judgment above, the network selects whether to use the radio high-speed packet data access channel to bear the CS-domain service data flexibly.

Figure 5:
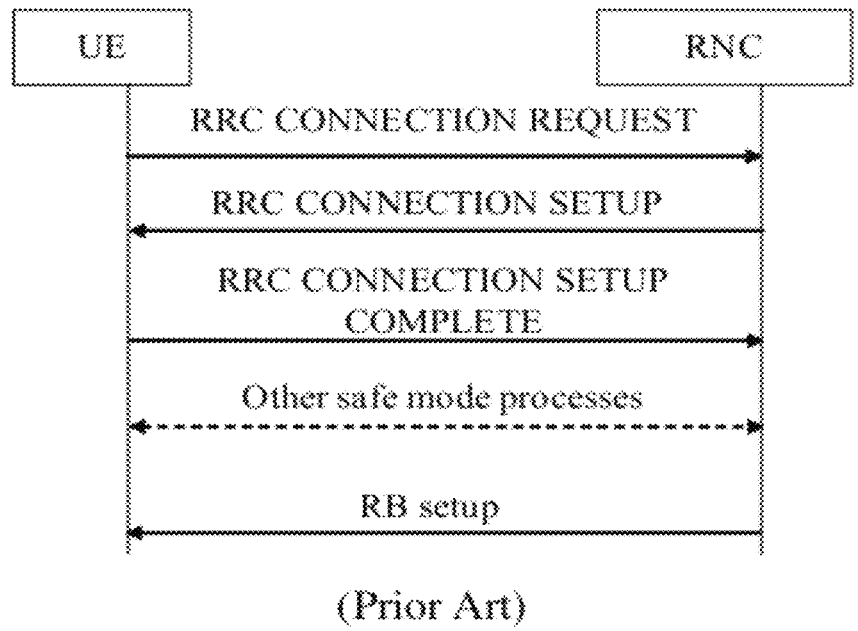
FIG. 5 is a simplified schematic diagram illustrating UE capability indication and RNC RB configuration in the related art.

Before the method of judging whether the UE supports the radio high-speed packet data access channel to bear the CS-domain service data is elaborated, the UE capability indication is introduced below. In the WCDMA system, the RNC needs to configure the RB in order to provide the bearer required by the service. In fact, when multiple types of configuration are possible, the RNC needs to select a type of configuration according to the UE capabilities. That is, the UE needs to indicate its capabilities to the RNC. FIG. 5 is a simplified schematic diagram illustrating UE capability indication and RNC RB configuration in the related art. Multiple capabilities may be indicated by the UE to the RNC. Some of the capabilities are carried in the an RRC CONNECTION REQUEST message, for example, HS-DSCH (HSDPA) capability, and E-DCH (HSUPA) capability, but most capabilities are carried in an RRC CONNECTION SETUP COMPLETE message. When setting up the Radio Resource Control (RRC) connection and RB, the RNC needs to consider the capability indication provided by the UE. That is, at the RRC CONNECTION SETUP and RADIO BEARER SETUP stage, the RNC needs to use the UE capability indication information to determine the configuration parameters of the bearer.

In this embodiment, the capability indication information carried in the RRC CONNECTION SETUP COMPLETE message indicates that the radio high-speed packet data access channel is supported to bear the CS-domain service data. For example, the existing UE Radio Access Capability Extension Information Element (IE) in the related art may be adopted. For example, a "CS over HSPA/HSPA+ Capability" IE is added into the existing UE Radio Access Capability Extension IE. Nevertheless, the embodiments of the present invention do not restrict use of the "UE Radio Access Capability Extension" IE, and the "CS over HSPA/HSPA+Capability" may also be set in other IEs.

If the UE supports the radio high-speed packet data access channel to bear the CS-domain service data, indication information (namely, the "CS over HSPA/HSPA+ Capability" IE) is carried in the "UE Radio Access Capability Extension" IE, and the value of the indication information is "True"; if the UE does not support the radio high-speed packet data access channel to bear the CS-domain service data, the value of the indication information is "False", or the IE does not carry the "CS over HSPA/HSPA+ Capability" IE.

Figure 6:
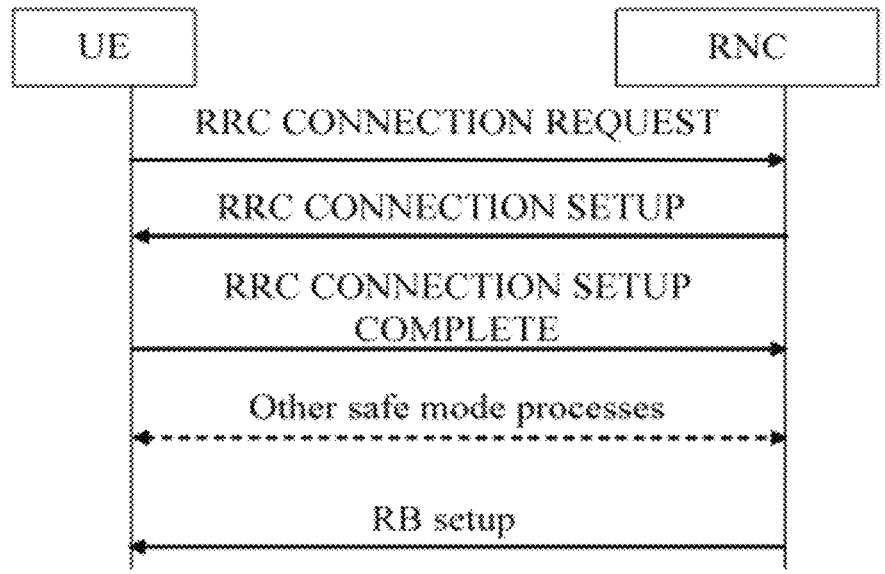
FIG. 6 is a simplified schematic diagram illustrating how a UE reports capability indication information in an embodiment of the present invention.

FIG. 6 is a simplified schematic diagram illustrating how a UE reports capability indication information in another embodiment of the present invention. If the RRC CONNECTION REQUEST message of the UE already indicates support of the radio high-speed packet access technology, the "Radio Access Capability Extension" IE that carries the "CS over HSPA/HSPA+ Capability" IE may be applied in the RRC Connection Setup Complete message. That is, in the RRC connection setup process, the UE may indicate whether the UE supports the radio high-speed packet data access channel to bear the CS-domain service data.

Alternatively, the "UE Radio Access Capability Extension" IE may be applied to the Inter RAT Handover INFO message or UE Capability Information message. That is, in the process of relocation/inter-system handover or UE capability query, the UE may indicate whether the UE supports the radio high-speed packet data access channel to bear the CS-domain service data.

Through the capability indication information reported by the UE, the network knows whether the UE supports the radio high-speed packet data access channel to bear the CS-domain service data in the following way.

The network judges whether the capability indication information whose value is "True", indicating that the UE supports the radio high-speed packet data access channel to bear the CS-domain service data, is received from the UE. If such capability indication information is received, the network determines that the UE supports the radio high-speed packet data access channel to bear the CS-domain service data.

The entity that judges the UE support capability in the WCDMA system may be an RNC of the network. For example, if the UE supports the E-DCH (HSUPA) or HS-DSCH (HSDPA), and the RRC CONNECTION SETUP COMPLETE message indicates support of the CS over HSPA/HSPA+, the RNC sets up the CS service on the HS-DSCH/E-DCH when the CS-domain core network sets up the CS service subsequently. The entity that judges the UE support capability in the CDMA system may be a BSC of the network. In the HSPA+, the entity may be a NodeB+. The judgment and processing processes in other systems are similar, and are not repeated here any further.

It is understandable that if the CS service data is borne over an HS-DSCH/E-DCH, the network needs to support CS over HSPA/HSPA+ at the same time. For example, in the WCDMA system, the RNC needs to support CS over HSPA/HSPA+. The entity that judges the UE support capability at the network side may be an RNC. Besides, the RNC needs to judge whether a cell (corresponding to a basestation) of the UE supports the HSPA. If the RNC of the network does not support CS over HSPA/HSPA+, it is not necessary to judge the terminal capability; or if the RNC knows that the network (for example, at least one of the RNC and the basestation) does not support the HSPA, the HSPA bearer is not available.

A second embodiment of the present invention provides a method for bearing CS-domain service data over radio bearer in the downlink direction.

The method includes: bearing CS-domain service data over a radio high-speed packet data access channel according to a first channel mapping relation between CS-domain service data and the radio high-speed packet data access channel, which is known as the first bearer mode.

After the CS-domain service data is borne on the radio high-speed packet data access channel, the method further includes: encapsulating the CS-domain service data into a data frame of the radio high-speed downlink packet data access channel in the downlink direction, which is known as the first encapsulation mode. The CS-domain service data is mapped to the radio bearer channel frame in the first encapsulation mode from layer to layer.

Figure 7:
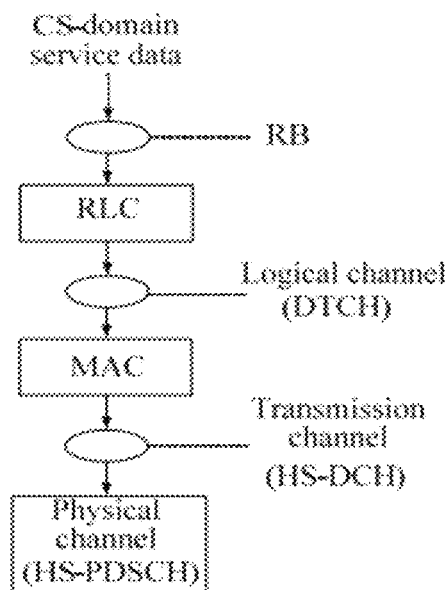
FIG. 7 is a simplified schematic diagram illustrating a channel mapping relation between CS-domain service data and a radio high-speed downlink packet data access channel in the downlink direction in the second embodiment of the present invention.

Specifically, the CS-domain service data is borne over radio bearer, and mapped to the radio high-speed downlink packet data access channel. FIG. 7 is a simplified schematic diagram illustrating a channel mapping relation between CS-domain service data and a radio high-speed downlink packet data access channel in the downlink direction in the second embodiment of the present invention. In the UMTS, the foregoing mapping process includes that the data over the RB is encapsulated through an RLC, and mapped to a DTCH; the DTCH is mapped to the HS-DSCH introduced by the radio high-speed packet data access technology; and finally, the HS-DSCH is mapped to the HS-PDSCH.

In the technical solution provided above, the CS-domain service data is borne over radio bearer. In practice, the CS-domain service data may be borne by other means. For example, each channel of CS-domain service data is borne over one RB channel; or, if the CS-domain service data includes multiple CS-domain service substreams, the multiple substreams may be encapsulated in one special speech frame, and borne over the same RB.

Figure 8:
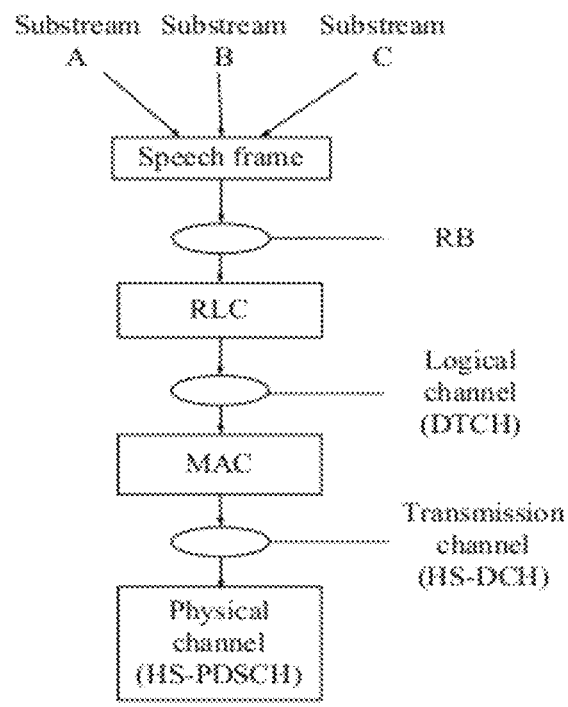
FIG. 8 is a simplified schematic diagram illustrating a channel mapping relation between CS-domain AMR speech service data and a radio high-speed downlink packet data access channel in the downlink direction in the second embodiment of the present invention.

The AMR speech service is given as an example here. In a scenario, three substreams are encapsulated into one special speech frame, and borne over a same RB. FIG. 8 is a simplified schematic diagram illustrating a channel mapping relation between CS-domain AMR speech service data and a radio high-speed downlink packet data access channel in the downlink direction in the second embodiment of the present invention. In the downlink direction, three substreams of the CS-domain AMR speech service data are encapsulated into one special speech frame, and borne over one RB channel; the data over the RB is encapsulated through an RLC, and mapped to a DTCH; the DTCH is mapped to the HS-DSCH introduced by the radio high-speed packet data access technology; and finally, the HS-DSCH is mapped to the HS-PDSCH.

In the foregoing channel mapping relation, the special speech frame is the same as that defined for the uplink direction.

In another embodiment, before the CS-domain service data is encapsulated into a data frame of the radio high-speed downlink packet data access channel, the method may further include a judgment step. The judgment step includes judging whether the CS-domain service data is borne over a radio high-speed downlink packet data access channel.

The judgment factors and judgment method are the same as those in the uplink direction. For example, the judgment method may include the following.

It is judged whether both the network and the UE support the radio high-speed downlink packet data access channel to bear the CS-domain service data; if both the network and the UE support the radio high-speed downlink packet data access channel to bear the CS-domain service data, a radio high-speed downlink packet data access channel is adopted to bear the CS-domain service data in the downlink direction; if at least one of the network and the UE does not support the radio high-speed downlink packet data access channel to bear the CS-domain service data, a non-radio high-speed packet data access channel is adopted to bear the CS-domain service data in the downlink direction.

Besides, if both the network and the UE support the radio high-speed downlink packet data access channel to bear the CS-domain service data, the network judges whether to select the radio high-speed downlink packet data access channel for bearing the CS-domain service data according to the load of the radio high-speed downlink packet data access channel and the load of the non-radio high-speed downlink packet data access channel in the network. The judgment conditions are similar to those for the uplink direction.

In the downlink direction, the network sets up a bearer according to the foregoing channel mapping relation, encapsulates the CS-domain speech service data into a data frame of the radio high-speed downlink packet data access channel on this bearer, and sends the encapsulated data frame out. After receiving the data frame, the UE unpacks the data frame to recover the CS-domain service data.

The method of judging whether the UE supports the radio high-speed downlink packet data access channel to bear the CS-domain service data is the same as that in the uplink direction, and is not repeated here any further.

The foregoing embodiment is described from the uplink or downlink perspective. It is understandable that the terminal capability indication information (namely, "CS over HSPA/HSPA+ Capability" IE) may indicate that the UE supports both uplink and downlink capabilities, or indicate only that the UE supports the uplink capability or the downlink capability. The name of this IE is not limited herein, and may be "CS over HSPA Capability" IE, "CS over HSPA+ Capability" IE, and so on. Moreover, this technical solution does not restrict the protocol version of the UE.

A third embodiment of the present invention provides another method for bearing CS-domain service data over radio bearer in the uplink direction.

Figure 9:
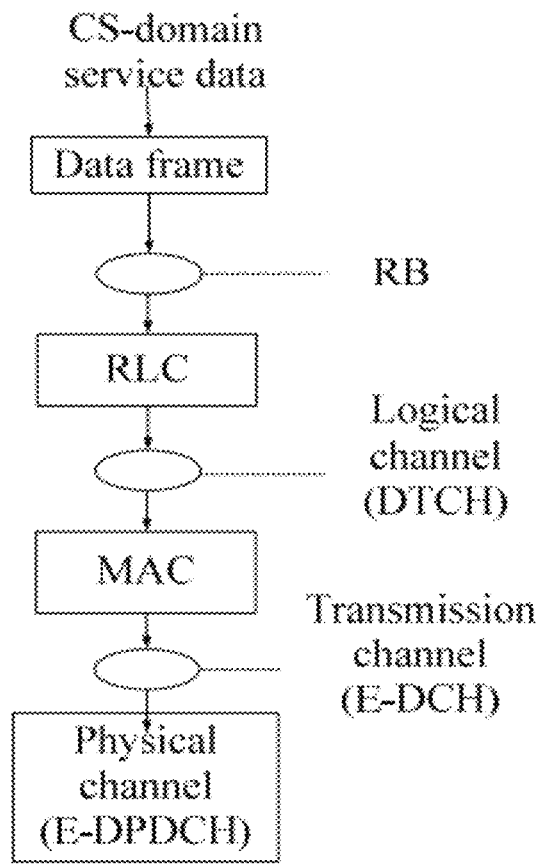
FIG. 9 is a simplified schematic diagram illustrating a channel mapping relation between CS-domain service data and a radio high-speed uplink packet data access channel in the uplink direction in the third embodiment of the present invention.

FIG. 9 is a simplified schematic diagram illustrating a channel mapping relation between CS-domain service data and a radio high-speed uplink packet data access channel in the uplink direction in the third embodiment of the present invention. As shown in FIG. 9, the CS-domain service data in the uplink direction may be encapsulated into one data frame, borne over one RB channel, and mapped to the radio high-speed uplink packet data access channel. The channel mapping relation from the RB to the radio high-speed uplink packet data access channel is the same as that in the first embodiment. The following primarily introduces the data frame defined in this embodiment.

In this embodiment, the data frame may be a newly defined PDCP Protocol Data Unit (PDU). The PDCP entity adopting the existing protocol stack encapsulates the uplink CS-domain service data into the newly defined PDCP PDU. Nevertheless. In another embodiment, the data may be processed by other entities. In another embodiment, the entity is a PDCP. The frame format used by the PDCP in the related art is outlined below before the PDCP PDU newly defined in this embodiment is described. There are three types of frame formats:

PDCP-No-Header PDU: This frame format has no overhead, and includes only a data field.

PDCP Data PDU: This frame format includes a 3-bit PDU Type field, a 5-bit Packet ID (PID) field, and a data field. Its overhead is one byte.

PDCP SeqNum Number PDU: This frame format includes a 3-bit PDU Type field, a 5-bit PID field, a 2-bit Sequence Number field, and a data field. Its overhead is three bytes.

In the protocol of the current version, the PDU Type field has two values: PDU Type="000" or "001". Other values (such as 010-111) are not adopted.

CS-domain services include speech service, video service, facsimile service, and so on. The features of the speech service data are different from the features of non-speech service data (CS data), and the new PDCP PDU may be defined through a different PDCP frame format.

(1) For non-speech services (CS data), because the service data is aligned against bytes and its length is fixed, the PDCP-No-Header PDU free of overhead may be selected for defining a new PDCP PDU. The new PDCP PDU includes the CS-domain non-speech service data, and has no overhead.

Figure 10:
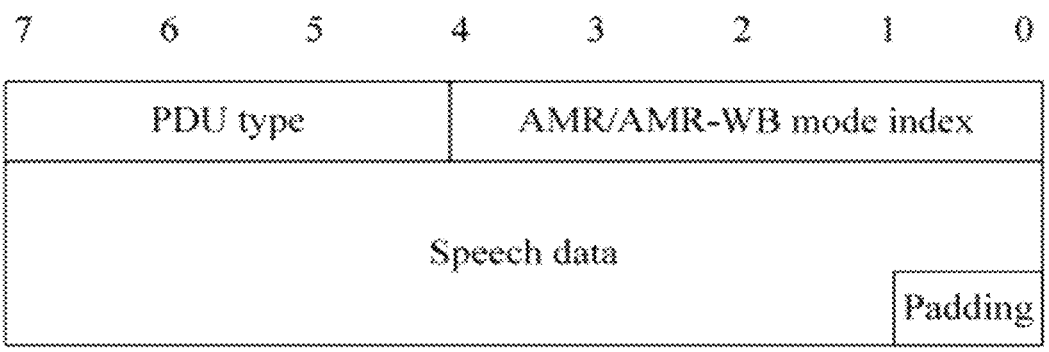
FIG. 10 is a simplified schematic diagram illustrating a PDCP PDU frame format applicable to encapsulating speech data in an embodiment of the present invention.

(2) For the AMR/AMR-WB speech service, because the speech service data includes multiple substreams. In this case, different coding modes are adopted, the sum of the length of the multiple substreams is not fixed, and the substreams are generally not aligned against bytes. Therefore, the coding mode needs to be indicated through an in-band signaling so that the receiver may know the total length of the substreams and the length of each substream. In this embodiment, the new PDCP PDU is defined in a PDCP Data PDU frame format. FIG. 10 is a simplified schematic diagram illustrating a PDCP PDU frame format applicable to encapsulating speech data in this embodiment. The PDCP PDU includes the following fields:

PDU Type field: The length of this field is three bits. The PDU Type field is configured to identify the type of the PDCP PDU newly defined in this embodiment. If difference is made between the PDCP applied to the CS domain and the PDCP applied to the PS domain, the PDU Type field may be any value among 000-111.

AMR/AMR-WB mode index field: The length of this field is five bits. The AMR/AMR-WB mode index field is configured to identify an AMR/AMR-WB coding mode. Table 3 and Table 4 show the AMR/AMR-WB mode index:

TABLE 3

| AMR mode index | Coding mode |
| --- | --- |
| 0 | AMR 4.75 kbit/s |
| 1 | AMR 5.15 kbit/s |
| 2 | AMR 5.90 kbit/s |
| 3 | AMR 6.70 kbit/s (PDC-EFR) |
| 4 | AMR 7.40 kbit/s (TDMA-EFR) |
| 5 | AMR 7.95 kbit/s |
| 6 | AMR 10.2 kbit/s |
| 7 | AMR 12.2 kbit/s (GSM-EFR) |
| 8 | AMR SID |

TABLE 4

| AMR-WB mode index | Coding mode |
|---|---|
| 0 | AMR-WB 23.85 kbit/s |
| 1 | AMR-WB 23.05 kbit/s |
| 2 | AMR-WB 19.85 kbit/s |
| 3 | AMR-WB 18.25 kbit/s |
| 4 | AMR-WB 15.85 kbit/s |
| 5 | AMR-WB 14.25 kbit/s |
| 6 | AMR-WB 12.65 kbit/s |
| 7 | AMR-WB 8.85 kbit/s |
| 8 | AMR-WB 6.60 kbit/s |
| 9 | AMR-WB SID 1.75 kbit/s* |

The mode indices shown in the two tables above are examples only. The embodiments of the present invention do not restrict the channel mapping relation between the index and the coding mode. The channel mapping relation may be configured by the upper layer (such as RRC), or stipulated by a protocol, or agreed by other means.

Speech Data field: The length of this field is not fixed. The Speech Data includes all connected substreams of the CS-domain speech service. The AMR speech service includes up to three substreams, and the AMR-WB speech service includes up to two substreams.

Padding field: When the Data field is not aligned against bytes, the Padding field is applied to accomplish alignment.

Figure 11:
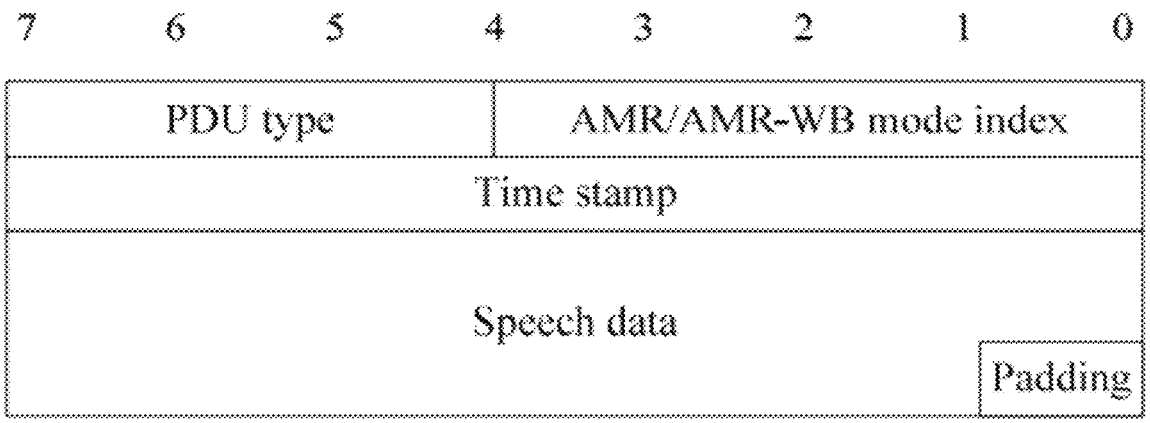
FIG. 11 is a simplified schematic diagram illustrating another PDCP PDU frame format applicable to encapsulating speech data in an embodiment of the present invention.

(3) After the speech service is borne over the HSPA, due to Hybrid Automatic Retransmission Request (HARM) and E-DCH soft handover, the delay jitters of the receiver may increase, and the speech Quality of Service (QoS) may decrease. A "de-jitter" operation may be performed at the receiver to improve the QoS. Therefore, time information may be introduced into the sent speech service data to define a new PDCP PDU frame format. FIG. 11 is a simplified schematic diagram illustrating another PDCP PDU frame format applicable to encapsulating speech data in an embodiment of the present invention. The PDCP PDU includes: a PDU Type field, an AMR/AMR-WB mode index field, a Speech Data field, a Time Stamp field, and a Padding field.

The PDU Type field, the AMR/AMR-WB mode index field, the Speech Data field, and Padding field are the same as those included in the PDCP PDU defined in section (2) above.

The Time Stamp field identifies the relative time of sending the speech service data, and its length may be eight bits, its unit may be 1 ms, and its value range is 0-254. The value "255" indicates that the time information is unavailable. Alternatively, its length may be eight bits, its value range is 0-255, and its unit may be 10 ms.

In practice, as regards whether to use the PDCP PDU defined in section (2) or section (3) above to encapsulate the speech service data, it depends on the upper-layer configuration (specifically, the RRC), the protocol, or the agreed mapping relation, which is not restricted herein.

Figure 12:
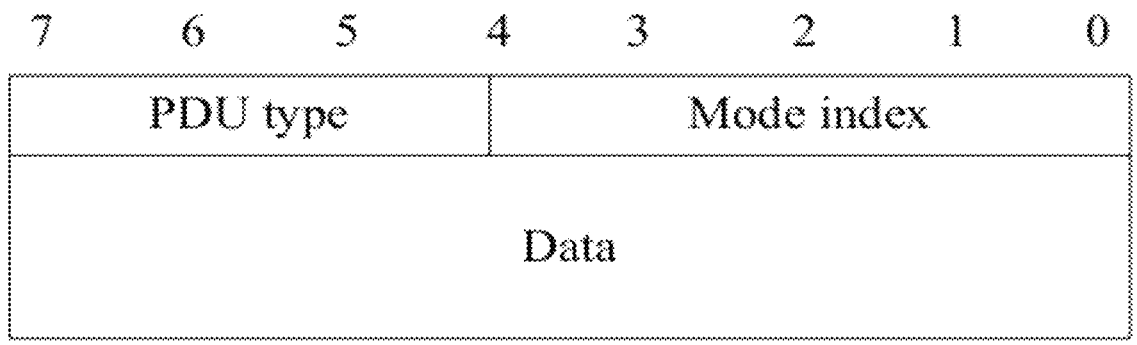
FIG. 12 is a simplified schematic diagram illustrating another PDCP PDU frame format applicable to encapsulating non-speech data in an embodiment of the present invention.

(4) For non-speech services, the PDCP PDU similar to that defined in section (2) may be defined instead of the PDCP PDU newly defined in section (1) above. FIG. 12 is a simplified schematic diagram illustrating another PDCP PDU frame format applicable to encapsulating non-speech data in an embodiment of the present invention. The PDCP PDU includes the following fields:

PDU Type field: The length of this field is three bits. The PDU Type field is configured to identify the type of the PDCP PDU newly defined in this embodiment. Its value may be any reserved value among 010-111.

Mode Index field: The length of this field is five bits. In this case, the Mode Index field is meaningless, and may have any value.

Data field: This field includes CS-domain non-speech service data. Because the data is aligned against bytes, no padding field is required.

It is understandable that the length and value range of a field in the PDCP PDU given above are only examples, and do not constitute any limitation on the technical solution herein. In implementing the technical solution under the present invention, other lengths or value ranges may be applied to such fields.

After the uplink CS-domain service data is borne over the radio high-speed uplink packet data access channel, the mobile station encapsulates the CS-domain service data into a data frame of the radio high-speed uplink packet data access channel on the bearer, and transmits the encapsulated data frame to the network. After receiving the data frame, the network unpacks the data frame to obtain the uplink CS-domain service data.

A fourth embodiment of the present invention provides another method for bearing CS-domain service data over radio bearer in the downlink direction.

Figure 13:
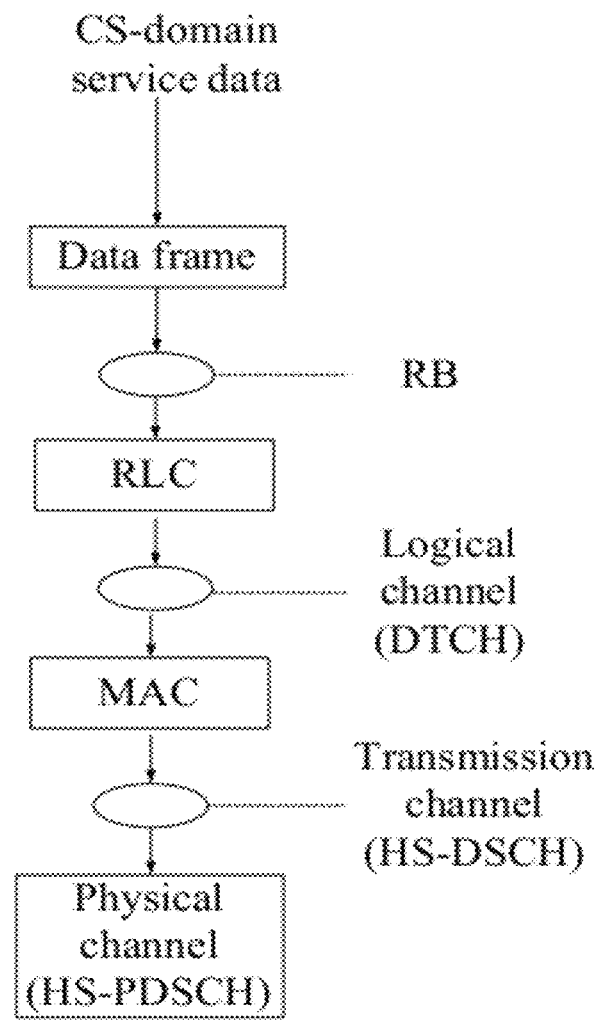
FIG. 13 is a simplified schematic diagram illustrating a channel mapping relation between CS-domain service data and a radio high-speed downlink packet data access channel in the downlink direction in the fourth embodiment of the present invention.

FIG. 13 is a simplified schematic diagram illustrating a channel mapping relation between CS-domain service data and a radio high-speed downlink packet data access channel in the downlink direction in the fourth embodiment of the present invention. As shown in FIG. 13, the CS-domain service data in the downlink direction may be encapsulated into a data frame, borne over one RB channel, and mapped to the radio high-speed downlink packet data access channel. The channel mapping relation from the RB to the radio high-speed downlink packet data access channel is the same as that in the first embodiment, and is not repeated here any further. The data frame in this embodiment may be a newly defined PDCP PDU, which is the same as the PDCP PDU defined in the third embodiment above.

After the downlink CS-domain service data is borne over the radio high-speed downlink packet data access channel, the network encapsulates the CS-domain service data into a data frame of the radio high-speed downlink packet data access channel on the bearer, and transmits the encapsulated data frame to the mobile station. After receiving the data frame, the mobile station unpacks the data frame to obtain the downlink CS-domain service data.

The newly defined PDCP PDU for encapsulating the CS-domain service data in the third embodiment and the fourth embodiment may be encapsulated and unpacked by the PDCP entity in the existing Uu interface protocol stack. In this way, little impact is brought to the current functions of the existing protocol stack.

Figure 14:
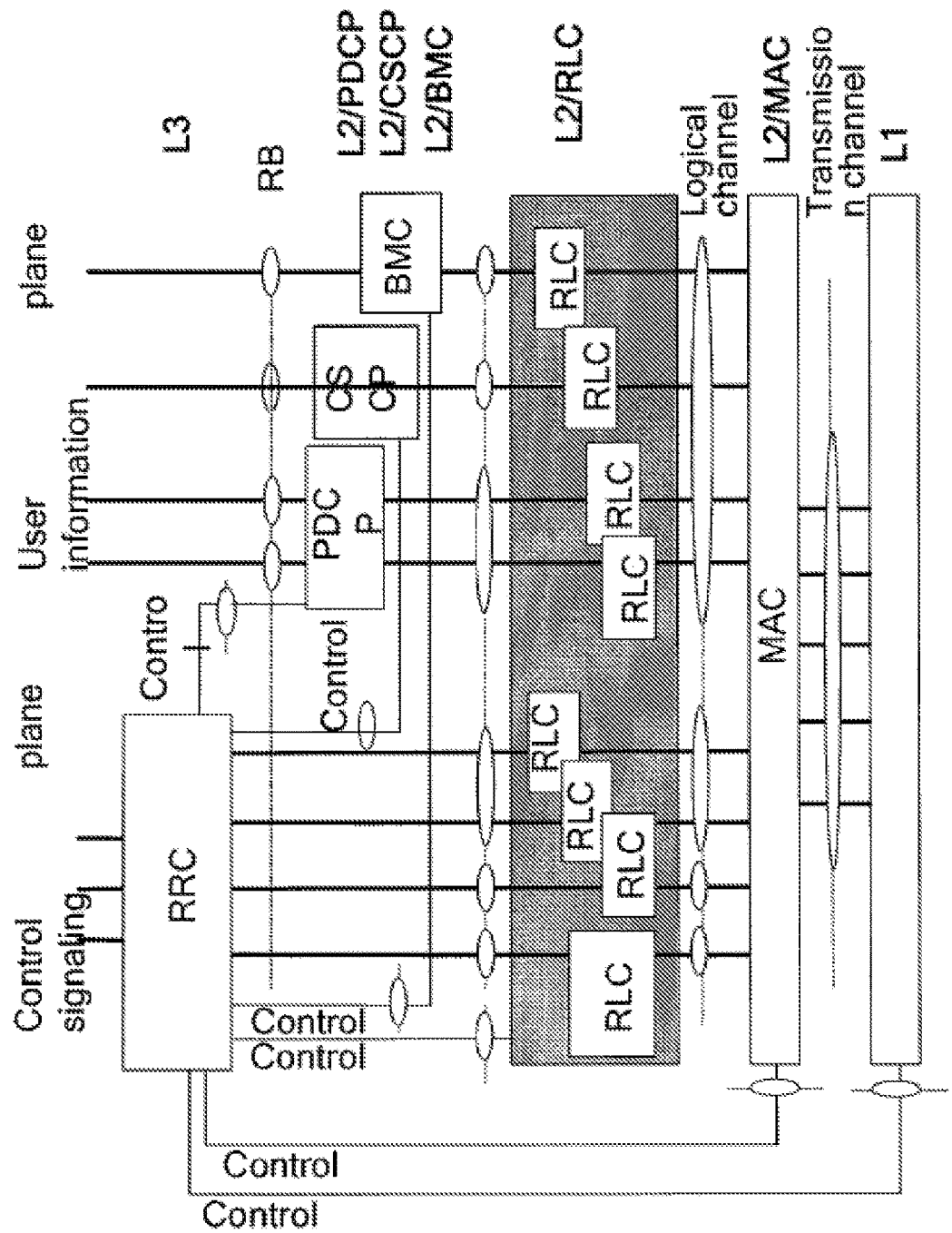
FIG. 14 is a simplified schematic diagram illustrating a location of a CSCP entity in a Uu interface in an embodiment of the present invention.

In the third embodiment and the fourth embodiment above, the data frame for encapsulating the CS-domain service data is the newly defined PDCP PDU. This embodiment puts forward another data frame called Circuit Service Convergence Protocol (CSCP) data frame, and a new protocol entity called "CSCP entity" may be added in the existing Uu interface to handle encapsulation and unpacking of the CSCP data frame. FIG. 14 is a simplified schematic diagram illustrating a location of a CSCP entity in a Uu interface in an embodiment of the present invention. In FIG. 14, a control SAP between the RRC and the CSCP entity is provided and the RRC controls the CSCP entity via the control SAP. The CSCP entity provides RB services for the upper layer, for example, bears the service data, such as speech service, video service, data service, and facsimile service.

Figure 15:
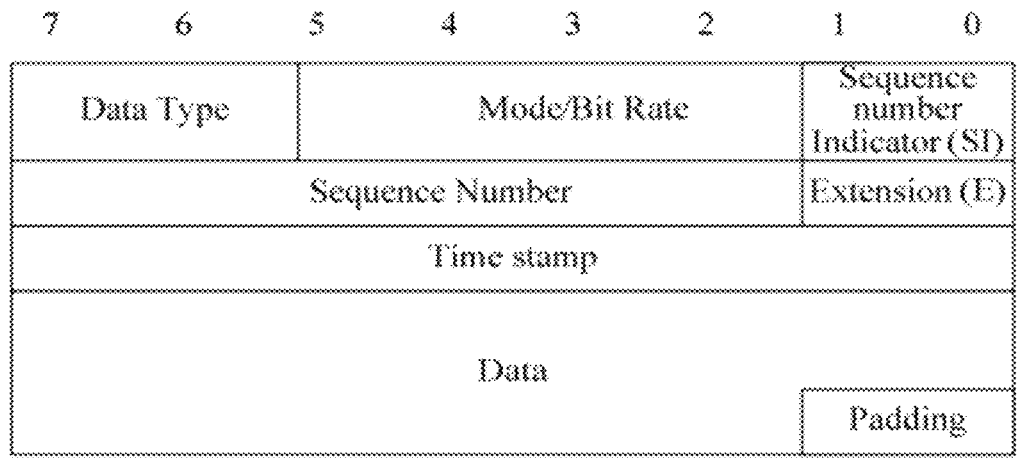
FIG. 15 is a simplified schematic diagram illustrating a structure of a CSCP data frame in an embodiment of the present invention.

The CSCP entity encapsulates the CS-domain service into a CSCP data frame. FIG. 15 is a simplified schematic diagram illustrating a structure of a CSCP data frame in an embodiment of the present invention.

Data Type field indicates the CS-domain service type, for example, speech service, video service, and facsimile service. Here the AMR and the AMR-WB are different service types.

The Mode/Bit Rate field indicates the length of the data field. If the service type is speech service, the Mode/Bit Rate field indicates the coding and decoding mode of the speech, and thus reflects the data length; if the service type is a service other than speech service, the Mode/Bit Rate field indicates the service rate, and thus reflects the data length. In the example shown in FIG. 15, the Mode/Bit Rate field occupies four bits. However, the embodiments of the present invention do not restrict the number of bits occupied by this field.

Sequence Number Indicator (SI) field indicates whether the next byte is a Sequence Number field or a Data field.

Sequence Number field indicates the sequence number of the CSCP data frame, and is available for the receiver to detect frame loss and perform other functions such as sorting. This field is optional.

Extension (E) field indicates whether the next byte is a Time Stamp field or a Data field.

Time Stamp field indicates the time stamp. This field is optional.

Data field includes CS-domain service data.

Padding field: When the Data field is not aligned against bytes, the Padding field is applied to accomplish alignment.

For voice services, the Data field includes all connected substreams of the speech service data.

The method for bearing CS-domain service data over radio bearer in this embodiment may include: bearing CS-domain speech service data over a radio high-speed packet data access channel according to a second channel mapping relation between CS-domain speech service data and the radio high-speed packet data access channel.

Figure 16:
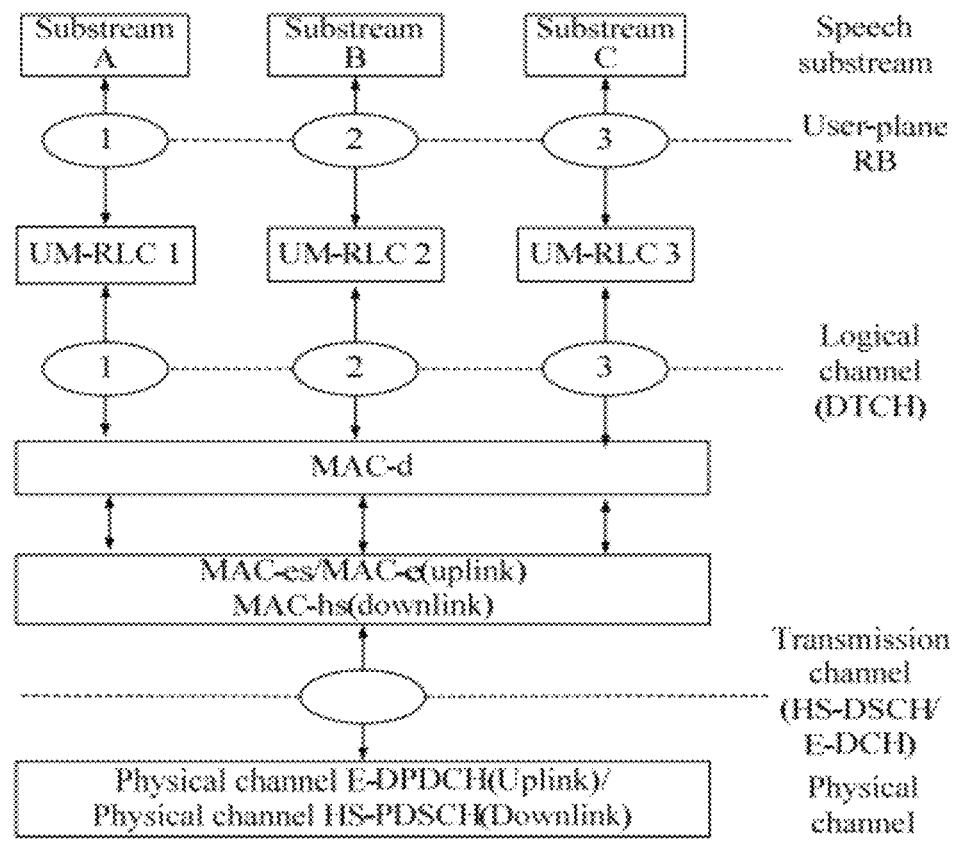
FIG. 16 is a simplified schematic diagram illustrating a second channel mapping relation between CS-domain speech service and a radio high-speed packet data access channel in an embodiment of the present invention.

Specifically, if the CS-domain service data includes more than one substreams, taking the speech service as an example (a non-speech service may also include more than one substream currently or in the future), each substream is borne over one RB channel, and mapped to the radio high-speed packet data access channel. FIG. 16 is a simplified schematic diagram illustrating a second channel mapping relation between CS-domain speech service and a radio high-speed packet data access channel in an embodiment of the present invention. In the UMTS, the foregoing process may include: Each substream of the CS-domain speech service is borne over one RB channel; the data over the RB is encapsulated through an RLC, and mapped to a DTCH; the DTCH is mapped to the E-DCH (uplink)/HS-DSCH (uplink) introduced by the radio high-speed packet data access technology; and finally, the E-DCH/HS-DSCH is mapped to the E-DPDCH (downlink)/HS-PDSCH (downlink). It is understandable that, although the UMTS is given as an example above, a similar channel mapping relation may be applied in the CDMA system to let the CS-domain service data be borne over the radio high-speed uplink packet data access channel.

As described above, each speech substream is borne over one RB channel, which is similar to the existing bearer mode in which the 3GPP R99 CS speech service is borne over the DCH. Such a practice brings these benefits: Because the number of RB sub streams in this solution is the same as the number of RB substreams in the case that the service data is borne over a DCH, it is easy to make changeover (including handover) from the R99 DCH network in the related art, no RB needs to be added or released, and only the RB mapping parameters need to be modified. That is, the speech employs three RBs in the bearer modes shown in table 4, and the changeover (including handover) process involves no change of the RB quantity.

In this solution, the CS-domain service data may be borne through the Unacknowledged Mode (UM) RLC mode, or other modes.

TABLE 5

| Scenario | Uplink | Downlink | Description |
|---|---|---|---|
| 1 | E-DCH(HSUPA) | HS-DSCH(HSDPA) | 3 RB |
| 2 | E-DCH(HSUPA) | DCH | 3 RB |
| 3 | DCH | HS-DSCH(HSDPA) | 3 RB |
| 4 | DCH | DCH | 3 RB |

Besides, the data frame of each speech substream above may be original data of the codec. In this case, the speech frame needs no special encapsulation protocol such as PDCP. Taking the AMR speech service as an example, the three substreams included by the AMR speech service data may be sent by the AMR coder directly. In this way, the extensibility of the codec mode is better supported. Nevertheless, the data frame of each speech substreams may also be the data encapsulated as required.

In conclusion, the channel mapping relation between the CS-domain service and the radio high-speed packet access channel may be the first channel mapping relation or the second channel mapping relation. In the first channel mapping relation, each channel of the CS-domain service data is borne over one RB channel; in the second channel mapping relation, each substream included by each channel of CS-domain service data packet is borne over one RB channel.

In this embodiment, the CS-domain service data is borne over the HS-DSCH/E-DCH, and it is impossible to adjust the working mode through the existing Traffic Flow Control (TFC) process in the related art. Therefore, the working mode needs to be adjusted through an extra radio bearer signaling. For example, an RRC command may be added to adjust the working mode on the HSPA. For example, the RRC command is a mode control command, and this command is applicable to all CS-domain services. The method for adjusting the mode may include: a coding mode is selected according to the received mode control command, the CS-domain service is encoded, and CS-domain service data is generated. It is understandable that all user frames do not need to choose adjustment. The system may decide the occasion of adjusting the coding mode. For example, in the UMTS, the RNC makes that decision.

It is understandable that this mode control command is applicable to: coding mode change (for example, change from the AMR to the AMR-WB coding mode), speech rate adjustment, service change (for example, change from speech to video, change from video back to speech), data service rate change, and so on.

Figure 17:
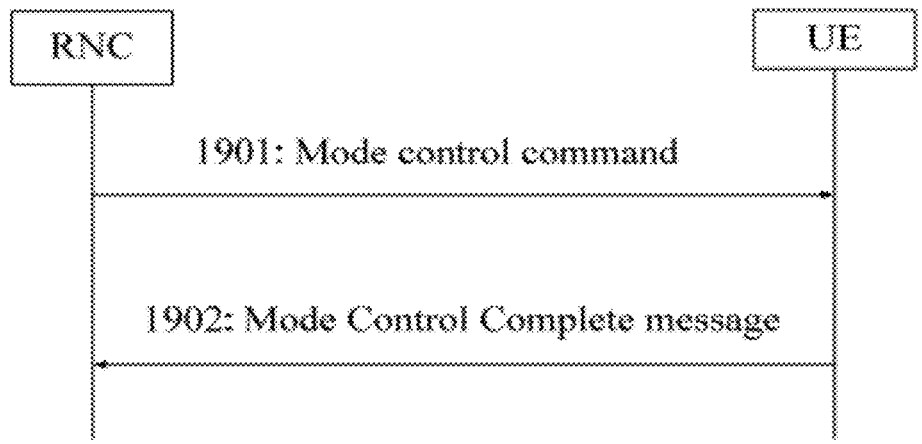
FIG. 17 is a simplified schematic diagram illustrating a method for adjusting an uplink AMR/AMR-WB CS-domain speech service coding mode in the third embodiment of the present invention.

The AMR/AMR-WBCS-domain speech service is given as an example here. FIG. 17 is a simplified schematic diagram illustrating a method for adjusting an uplink AMR/AMR-WB CS-domain speech service rate in the third embodiment of the present invention.

Step 1901: The radio network sends a mode control command to the radio UE. The command carries the maximum allowed coding rate of the radio UE.

In the WCDMA system and TD-SCDMA system, the radio network node is an RNC; in the CDMA system, the radio network node is a BSC.

Step 1902: According to the received mode control command, the radio UE selects the coding rate, and returns a Mode Control Complete message to the RNC. The coding rate selected by the radio UE may be the maximum coding rate stipulated by the RNC, or a coding rate lower than the maximum coding rate. The radio UE encodes the speech service according to the selected coding rate, and generates speech service data.

The maximum allowed coding rate of the radio UE in step 1901 may be borne in one of the following modes.

Mode 1: The maximum coding rate is borne directly, for example, 7.95 Kbps and 4.74 Kbps. After receiving the indication, the radio UE restricts the coding rate to the maximum allowed coding rate or a coding rate lower than the maximum coding rate.

Mode 2: An index of the coding rates of all modes is predetermined. The mode control message carries the index of the maximum coding rates, and the radio UE determines the maximum allowed coding rate according to the received index, and restricts the coding rate to the maximum allowed coding rate or a lower rate.

Through the foregoing mode control steps, the mobile station adjusts the uplink working mode of the CS-domain service data according to the command of the radio network.

During communication of the radio UE, some cells do not support the radio high-speed packet data access, or supports the radio high-speed packet data access in only one direction, or the factors for judging the bearer mode change for certain reasons in the cell. Consequently, the mode of bearing the CS-domain service data changes, which occurs in the following scenarios.

Scenario 1: The status of the radio UE that a radio high-speed packet data access channel is adopted in both the uplink and downlink directions changes to another status that a radio high-speed packet data access channel is adopted in one of the uplink direction and downlink direction and a non high-speed packet data access channel is adopted in the other direction (2H→1H1D). In this Scenario, the CS-domain service data in the direction that needs to change the bearer channel may be encapsulated into a data frame of a non high-speed packet data access channel over the non high-speed packet data access channel according to the preset third channel mapping relation between the CS-domain service and the non high-speed packet data access channel.

Scenario 2: The status of the radio UE that a radio high-speed packet data access channel is adopted in both the uplink and downlink directions changes to another status that a non high-speed packet data access channel is adopted in both uplink and downlink directions (2H→2D). In this Scenario, the CS-domain service data may be encapsulated into a data frame of a non high-speed packet data access channel in both uplink and downlink directions according to the preset third channel mapping relation between the CS-domain service and the non high-speed packet data access channel.

Scenario 3: The status of the radio UE that a radio high-speed packet data access channel is adopted in only one direction (either uplink or downlink direction) and a non high-speed packet data access channel is adopted in the other direction changes to another status that a non high-speed packet data access channel is adopted in both uplink and downlink directions (1H1D→2D). In this Scenario, the CS-domain service data may be encapsulated into a data frame of a non high-speed packet data access channel in both uplink and downlink directions according to the preset third channel mapping relation between the CS-domain service and the non high-speed packet data access channel (for example, the CS-domain service data in the direction that needs to change bearer channel is borne over a non high-speed packet data access channel; in the other direction, the CS-domain service data is already borne over the non high-speed packet data access channel).

In the three scenarios above, the method of encapsulating the CS-domain service into a data frame of a non high-speed packet data access channel according to the preset third channel mapping relation may include: Each channel of CS-domain service data is borne over radio bearer channel, and mapped to the non high-speed packet data access channel. Alternatively, the method may include: each substream of each channel of CS-domain service data is borne over radio bearer channel, and mapped to the non high-speed packet data access channel. The service data that includes more than one substream may be speech service data.

Taking the speech service as an example, no matter whether the service data is borne over the HSPA or DCH, it is possible that each channel of speech services is borne over one RB channel, or each substream is borne over one RB channel. Therefore, the number of RBs before the changeover may be equal to or unequal to the number of RBs after the changeover (in the case of HSPA 3RB, the service data has no choice but to change over to the 3RB DCH). For example, the R99 DCH mapping mode defined by the 3GPP may be applied, namely, the substreams of the speech service are mapped to different RBs. Taking the AMR speech as an example, the AMR speech service data includes three substreams (for example, substreams A, B and C). When the service data changes over from the HSPA to the DCH, if the three substreams are borne over one RB channel before the changeover, the channel mapping parameters of the old RB may be modified so that the old RB bears a substream (such as sub stream A) of the AMR service data; and two new RBs are added to bear the remaining substreams (such as substreams B and C) of the AMR service data. Specifically, in an RB Setup process, two RBs are added and the existing RB mapping parameters are modified so that the service data changes over from one RB to three RBs. However, if the service data is already borne in the form of three substreams before changeover of the bearer channel (namely, when the service data is borne over the HSPA), no RB needs to be added. It is also possible that the service data is borne over one HSPA RB before changeover, and borne over one DCH RB after changeover.

In the three scenarios above, the service data is borne over a high-speed packet data access channel in at least one direction (for example, uplink or downlink), and then changes over to another bearer state, namely, in at least one direction, the service data over an HSPA channel changes over to the DCH channel. In practice, it is also possible that the service data is borne over a non high-speed packet data access channel in at least one direction, and then changes over to another bearer state, namely, in at least one direction, the service data over a DCH channel changes over to the HSPA channel, as exemplified in the following scenarios.

Scenario 4: The status of the radio UE that a non high-speed packet data access channel is adopted in both uplink and downlink directions, is changed to another status that a radio high-speed packet data access channel is adopted in both uplink and downlink directions (2D→2H). In this case, the CS-domain service data may be borne over the radio high-speed packet data access channel in both uplink and downlink directions according to the first or second channel mapping relation between the CS-domain service and the radio high-speed packet data access channel.

In this scenario (2D→2H), it is assumed that the service is a speech service, multiple RBs are used to bear multiple substreams of the speech service (for example, AMR substreams A, B and C) before changeover, and the bearer mode needs to change to the first bearer mode corresponding to the first channel mapping relation. For the UMTS system, therefore, the RB may be deleted and the RB mapping parameters may be modified in an RB Release process so that the service data changes over from three RBs to one RB.

Scenario 5: The status of the radio UE that a radio high-speed packet data access channel is adopted in only the uplink or downlink direction, and a non high-speed packet data access channel is adopted in the other direction, is changed to another status that a radio high-speed packet data access channel is adopted in both uplink and downlink directions (1H1D→2H). In this case, the CS-domain service data in the direction that needs change of the bearer channel is borne over the radio high-speed packet data access channel according to the first or second channel mapping relation between the CS-domain service and the radio high-speed packet data access channel.

Scenario 6: The status of the radio UE that a non high-speed packet data access channel is adopted in both uplink and downlink directions, is changed to another status that a radio high-speed packet data access channel is adopted in only uplink or downlink direction, and a non high-speed packet data access channel is adopted in the other direction (2D→1H1D). In this case, the CS-domain service data in the direction that needs change of the bearer channel is borne over the radio high-speed packet data access channel according to the first or second channel mapping relation between the CS-domain service and the radio high-speed packet data access channel.

In this scenario (2D→1H1D), it is assumed that the service is a speech service, multiple RBs are used to bear multiple substreams of the speech service (for example, AMR speech substreams A, B and C) before changeover. For the UMTS system, therefore, the RB may be deleted and the RB mapping parameters may be modified in an RB Release process so that the service data changes over from three RBs to one RB.

It is understandable that the RB addition, RB deletion, and RB mapping parameter modification may also be implemented in other processes such as RB setup process.

The scenarios above is illustrated in Table 6, 2H indicates that the service data is borne over an HSPA/HSPA+ channel in both uplink and downlink directions; 1H1D indicates that the service data is borne over an HSPA/HSPA+ channel in only the uplink or downlink direction, and borne over a DCH channel in the other direction; and 2D indicates that the service data is borne over a DCH channel in both uplink and downlink directions.

TABLE 6

| Scenario | Status before changeover | Status after changeover | RB after changeover |
| --- | --- | --- | --- |
| 1 | 2H | 1H1D | 1 RB |
| 2 | 2H | 2D | 1 RB or 3 RBs |
| 3 | 1H1D | 2D | 1 RB or 3 RBs |
| 4 | 2D | 2H | 1 RB |
| 5 | 1H1D | 2H | 1 RB |
| 6 | 2D | 1H1D | 1 RB |

Figure 18:
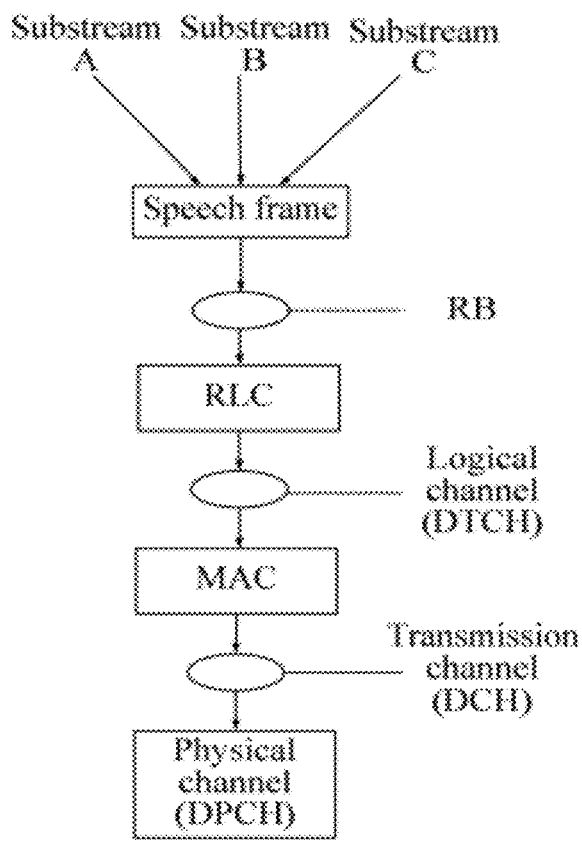
FIG. 18 is a simplified schematic diagram illustrating a channel mapping relation between CS-domain AMR speech service data and a non-radio high-speed uplink packet data access channel in the uplink direction in an embodiment of the present invention.

Taking the CS-domain AMR speech service data as an example, FIG. 18 is a simplified schematic diagram illustrating a channel mapping relation between CS-domain AMR speech service data and a non-radio high-speed uplink packet data access channel in the uplink direction in an embodiment of the present invention. In the uplink direction, the second encapsulation mode is applied, three substreams of the CS-domain AMR speech service data are encapsulated into a speech frame, and borne over one RB channel; the data over the RB is encapsulated through an RLC, and mapped to a DTCH; the DTCH is mapped to the DCH introduced by the non high-speed packet data access technology; and finally, the DCH is mapped to the DPCH.

In the downlink direction, the second encapsulation mode is applied, three substreams of the CS-domain AMR speech service data are encapsulated into one special speech frame, and borne over one RB channel; the data over the RB is encapsulated through an RLC, and mapped to a DTCH; the DTCH is mapped to the DCH introduced by the non high-speed packet data access technology; and finally, the DCH is mapped to the DPCH.

In the foregoing changeover process, the channel mapping relation between the CS-domain service data and the non radio high-speed packet data traffic channel ensures the radio UE to change the bearer mode successfully as required.

Described above are the scenarios in which the bearer mode is changed. It is understandable that if the service data is already borne over a non radio high-speed uplink packet data access channel at the time of judging the bearer mode, the third mapping relation above also applies.

Moreover, if special speech frames are borne over the non radio high-speed uplink packet data access channel (such as DCH), the aforementioned mode control command needs to be applied. This command is elaborated above, and is not repeated here any further.

Figure 19:
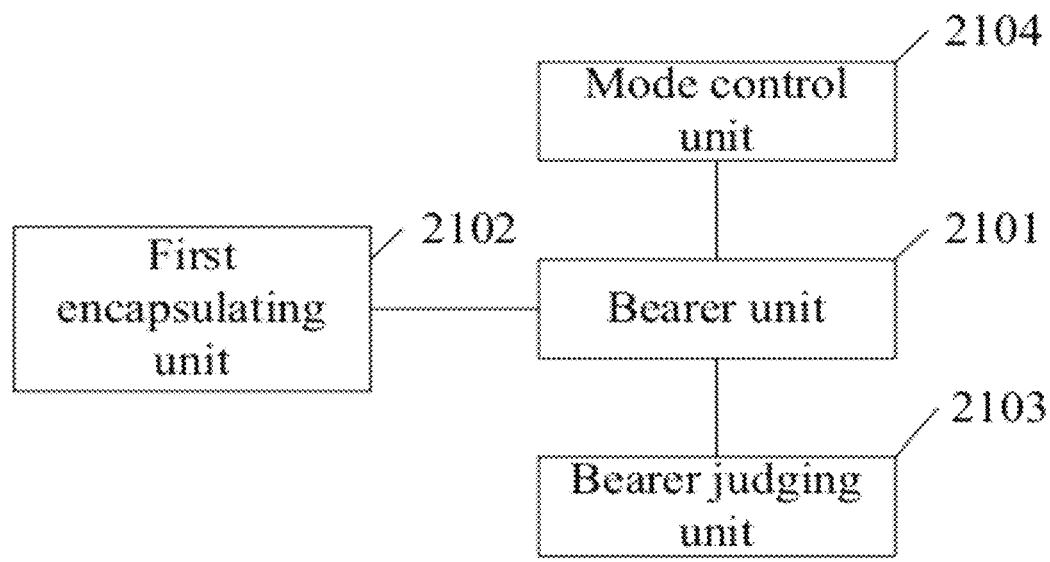
FIG. 19 is a simplified schematic diagram illustrating a structure of a radio network node in an embodiment of the present invention.

A radio network node is provided in an embodiment of the present invention. FIG. 19 is a simplified schematic diagram illustrating a structure of a radio network node in this embodiment. The radio network node may include a bearer unit 2101 that is configured to bear CS-domain service data over a radio high-speed packet data access channel according to the first channel mapping relation between CS-domain service data and the radio high-speed packet data access channel.

When the bearer unit 2101 bears the CS-domain service data over the radio high-speed packet data access channel, each channel of the CS-domain service data is borne over one RB channel in the downlink direction, and is mapped to a radio high-speed downlink packet data access channel.

Alternatively, when the bearer unit 2101 bears the CS-domain service data over the radio high-speed packet data access channel, each substream included in each channel of CS-domain service data is borne over one RB channel, and is mapped to a radio high-speed packet data access channel.

The radio network node further includes: a first encapsulating unit 2102, configured to encapsulate the downlink CS-domain service data into a data frame of the radio high-speed downlink packet data access channel on the bearer set up by the bearer unit 2101. After receiving the data frame, the radio UE unpacks the data frame to recover the CS-domain service data.

In the case that a data frame of the radio high-speed uplink packet data access channel is sent in the uplink direction, the radio network node may include a first unpacking unit, which is configured to unpack the received data frame of the radio high-speed uplink packet data access channel to obtain uplink CS-domain service data on the bearer set up by the bearer unit 2101.

When the radio network node includes a bearer unit 2101, the radio network node may further include a bearer judging unit 2103 that is configured to judge whether the CS-domain service data is borne over a radio high-speed downlink packet data access channel in the downlink direction; and, if the CS-domain service data is borne over the radio high-speed downlink packet data access channel in the downlink direction, to notify the bearer unit 2101 to bear the CS-domain service data over the radio high-speed packet data access channel.

The bearer judging unit 2103 is further configured to judge whether the CS-domain service data is borne over a radio high-speed uplink packet data access channel in the uplink direction; and, if the CS-domain service data is borne over the radio high-speed uplink packet data access channel in the uplink direction, notify the radio UE to bear the CS-domain service data over the radio high-speed uplink packet data access channel. Specifically, that may be implemented by sending channel configuration parameters to the radio UE.

The bearer judging unit 2103 further includes an indication receiving sub-unit, which is configured to receive capability indication information from a UE, indicating whether the UE supports the radio high-speed downlink packet data access channel to bear the CS-domain service data.

The judgment factors and the judgment method of the bearer judging unit 2103 are described above.

Through the bearer judging unit 2103 above, the network decides whether to use the radio high-speed downlink packet data access channel to bear the CS-domain service data as required.

In the communication process, if control needs to be exercised on the radio UE to select the working mode of the CS-domain service, the radio network node may further include a mode control unit 2104, which is configured to send a mode control command to the radio UE, in order to control the radio UE to select the working mode of the CS-domain service.

Through the coding mode control unit, the network node can control the radio UE to select the working mode of the uplink CS-domain service data.

It is understandable that, as determined through a judgment process, or, if the bearer mode changes, the service data may be borne over the non high-speed downlink packet data access channel. In this case, the radio network node may further include:

a second encapsulating unit, which is configured to encapsulate the downlink CS-domain service data into a data frame of the non high-speed downlink packet data access channel on the bearer set up according to the channel mapping relation between the CS-domain service data and the non high-speed packet data access channel.

Through the second encapsulating unit, the network may select the bearer mode flexibly as required, or change the bearer mode smoothly.

In the case that the data frame of the non radio high-speed uplink packet data access channel is sent in the uplink direction of the radio UE, the radio network node may further include a second unpacking unit, configured to unpack the received data frame of the non high-speed uplink packet data access channel to obtain the uplink CS-domain service data.

Figure 20:
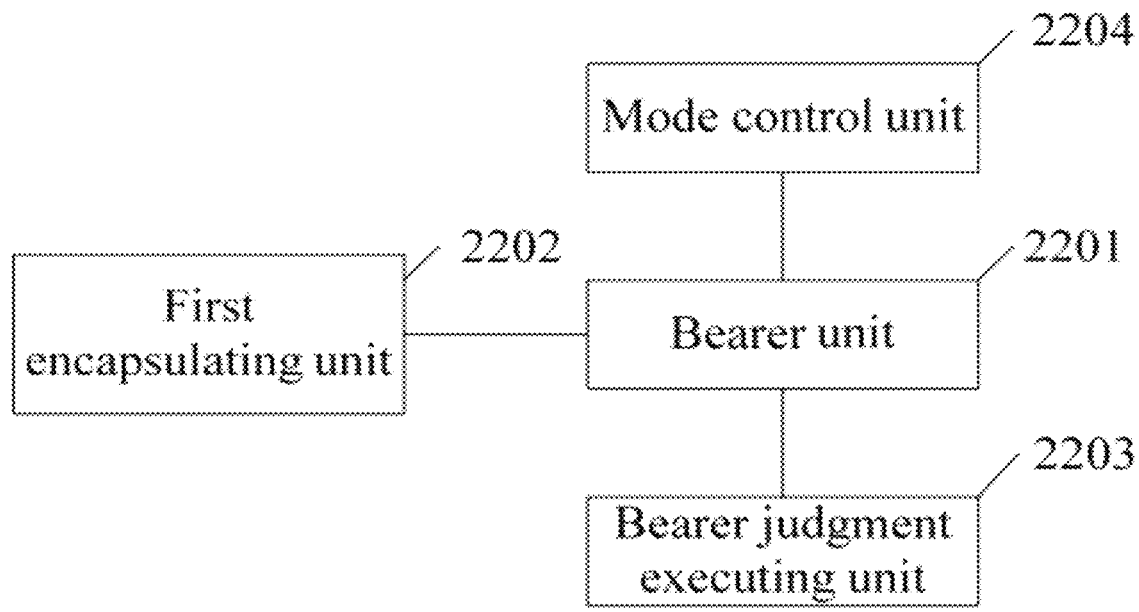
FIG. 20 is a simplified schematic diagram illustrating a structure of a radio UE in an embodiment of the present invention.

A radio UE is provided in another embodiment of the present invention. FIG. 20 is a simplified schematic diagram illustrating a structure of a radio UE in this embodiment. The radio UE may include a bearer unit 2201 that is configured to bear CS-domain service data over a radio high-speed packet data access channel according to the first channel mapping relation between CS-domain service data and the radio high-speed packet data access channel.

When the bearer unit 2201 bears the CS-domain service data over the radio high-speed packet data access channel, each channel of CS-domain service data is borne over one RB channel in the uplink direction, and is mapped to a radio high-speed uplink packet data access channel.

Alternatively, when the bearer unit 2201 bears the CS-domain service data over the radio high-speed packet data access channel, each substream included in each channel of CS-domain service data is borne over one RB channel, and is mapped to a radio high-speed packet data access channel.

Further, the radio UE may further include a capability indicating unit, which is configured to send capability indication information to the network, indicating whether the UE supports the radio high-speed downlink packet data access channel to bear the CS-domain service data.

The radio UE may further include: a first encapsulating unit 2202, configured to encapsulate the uplink CS-domain service data into one data frame of the radio high-speed uplink packet data access channel on the bearer set up by the bearer unit 2201. After receiving the data frame, the radio network node unpacks the data frame to recover the CS-domain service data.

In the case that a data frame of the radio high-speed downlink packet data access channel is sent in the downlink direction of the radio network, the radio UE further includes a first unpacking unit, which is configured to unpack the received data frame of the radio high-speed downlink packet data access channel to obtain downlink CS-domain service data on the bearer set up by the bearer unit 2201.

When the radio UE includes a bearer unit 2201, the radio UE may further include a bearer judgment executing unit 2203 that is configured to notify the bearer unit 2201 to bear the CS-domain service data over the radio high-speed packet data access channel if the network determines that the CS-domain service data is borne over a radio high-speed uplink packet data access channel in the uplink direction. Specifically, channel configuration parameters are sent to the radio UE when the network determines that the CS-domain service data is borne over a radio high-speed uplink packet data access channel in the uplink direction, and then the UE bears the CS-domain service data over the radio high-speed packet data access channel.

In the communication process, if control needs to be exercised on the radio UE to select the working mode of the CS-domain service, the radio UE may further include a mode control unit 2204, which is configured to receive a mode control command from the radio network node, and select the working mode of the CS-domain service according to the mode control command.

Through the foregoing mode control unit 2204, the radio UE selects the working mode of the uplink CS-domain service according to the command of the radio network node.

It is understandable that, as determined at the network side, or, if the bearer mode changes, the service data may be borne over the non high-speed uplink packet data access channel. In this case, the radio UE may further include a second encapsulating unit, which is configured to encapsulate the uplink CS-domain service data into a data frame of the non high-speed uplink packet data access channel on the bearer set up according to the channel mapping relation between the CS-domain service data and the non high-speed packet data access channel.

Through the second encapsulating unit, the network can select the bearer mode flexibly as required, or change the bearer mode smoothly.

In the case that a data frame of the non radio high-speed downlink packet data access channel is sent in the downlink direction of the radio network, the radio UE may further include a second unpacking unit, which is configured to unpack the received data frame of the non high-speed downlink packet data access channel to obtain downlink CS-domain service data.

A system for bearing CS-domain service data over radio bearer is provided in another embodiment of the present invention. The system may include a radio network node and a radio UE.

The radio network node includes a first bearer unit which is configured to bear CS-domain service data over a radio high-speed downlink packet data access channel according to a first channel mapping relation between CS-domain service data and the radio high-speed packet data access channel in the downlink direction, where the channel mapping relation may be one of the first channel mapping relation and the second channel mapping relation described in the method embodiment.

The radio UE includes a second bearer unit which is configured to bear the CS-domain service data over a radio high-speed uplink packet data access channel according to the first channel mapping relation between CS-domain service data and the radio high-speed packet data access channel in the uplink direction, where the channel mapping relation may be one of the first channel mapping relation and the second channel mapping relation described in the method embodiment.

In fact, the system may include the network node and the radio UE provided in the apparatus embodiment. It is understandable that in the radio bearer system herein, the radio network node may further include: a first encapsulating unit, a first unpacking unit, a bearer judging unit, a mode control unit, a second encapsulating, and a second unpacking unit. The relations between units are elaborated in the apparatus embodiment, and are not repeated here any further. The radio UE may further include: a first encapsulating unit, a first unpacking unit, a bearer judgment executing unit, a mode control unit, a second encapsulating, and a second unpacking unit. The relations between units are elaborated in the apparatus embodiment, and are not repeated here any further.

The method, system and apparatus for bearing CS-domain service data over radio bearer are not only applicable to a UMTS network, but also applicable to a CDMA network and other IP bearer-based radio networks for CS-domain speech, videophone, facsimile, and so on. The method under the present invention is also applicable to the scenario in which the CS-domain service is mapped from the CS-domain channel to the Data Only (DO) channel on a CDMA entity. The applications in other systems are described at the beginning of the embodiment, and are not repeated here any further.

In conclusion, the method, system, and apparatus for bearing CS-domain service data over radio bearer herein let the existing CS-domain service data be borne over a radio high-speed packet data access channel according to a channel mapping relation between the CS-domain service data and the radio high-speed packet data access channel. The traditional circuit network is applied at the network side so that the service QoS is ensured. With the enormous data throughput gain brought by the radio high-speed data access technology, the bearer efficiency and the network capacity of the interface are improved, and the CS-domain service is borne efficiently. For the network, the embodiments of the present invention reserves the existing CS-domain network architecture, and are independent of the network deployment of the IP multimedia service; the radio UE needs only to support the radio high-speed packet data access feature, and does not need to support the application-layer signaling of the IP multimedia service network, thus reducing the cost.

Moreover, the embodiments of the present invention provide a solution to indicating UE capabilities so that the network can make accurate judgment according to the indication and avoid incorrect selection of the bearer mode. The channel mapping relation is flexible and diversified, and can meet different communication requirements. The embodiments of the present invention also provide solutions to various handover scenarios.

It is understandable to those skilled in the art that all or part of the steps in the foregoing embodiments may be implemented by hardware instructed by a program. The program may be stored in a computer-readable storage medium such as Read Only Memory (ROM), Random Access Memory (RAM), magnetic disk, or Compact Disk (CD).

Although the invention has been described through several preferred embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for processing circuit switched (CS) domain service data over a radio bearer, wherein the CS-domain service data includes a speech service data comprising substreams A, B, and C with different importance classes, the method comprising:
   encapsulating the substreams A, B, and C into a single speech frame;
   mapping the speech frame onto a single radio bearer (RB);
   encapsulating the RB with radio link control (RLC) protocol;
   mapping the RLC to a dedicated traffic channel (DTCH); and
   mapping the DTCH to an enhanced dedicated channel (E-DCH);
   wherein the speech frame comprises: Frame Type, Payload, and Padding, wherein the Frame Type has a fixed length and represents an AMR/AMR-WB coding mode, the payload is a data made up of the concatenated substreams A, B and C, and the padding is a filler bit, when a sum of the frame type and the payload is out of alignment against bytes, several bits are used as a padding to make the whole speech frame aligned against bytes.

2. The method of claim 1, further comprising:
   sending capability indication information indicating whether a user equipment (UE) supports radio high-speed packet data access channel to bear the CS-domain service data to a network.

3. The method of claim 1, further comprising:
mapping the E-DCH to enhanced dedicated physical data channel (E-DPDCH).

4. The method of claim 1, wherein the CS-domain service data is one of CS-domain Adaptive Multi-Rate (AMR) speech service data and AMR WideBand (AMR-WB) speech service data.

5. The method of claim 1, further comprising:
receiving a mode control command comprising coding rate information.

6. A user equipment (UE), comprising:
a processor, and
a computer readable medium comprising a computer program stored in a non-transitory medium that, when executed by the processor, causes the processor to:
encapsulate substreams A, B, and C with different importance classes into a single speech frame, wherein the substreams A, B, and C are included in a speech service data of CS-domain service data;
map the single speech frame onto a single radio bearer (RB);
encapsulate the RB with radio link control (RLC) protocol;
map the RLC to a dedicated traffic channel (DTCH); and
map the DTCH to an enhanced dedicated channel (E-DCH);
wherein the speech frame comprises: Frame Type, Payload, and Padding, wherein the Frame Type has a fixed length and represents an AMR/AMR-WB coding mode, the payload is a data made up of the concatenated substreams A, B and C, and the padding is a filler bit, when a sum of the frame type and the payload is out of alignment against bytes, several bits are used as a padding to make the whole speech frame aligned against bytes.

7. The UE of claim 6, further comprising:
a transmitter configured to send capability indication information indicating whether a UE supports radio high-speed packet data access channel to bear the CS-domain service data to a network.

8. The UE of claim 6, wherein the processor is further configured to map the E-DCH to enhanced dedicated physical data channel (E-DPDCH).

9. The UE of claim 6, wherein the CS-domain service data is one of CS-domain Adaptive Multi-Rate (AMR) speech service data and AMR WideBand (AMR-WB) speech service data.

10. The UE of claim 6, further comprising:
a receiver, configured to receive a mode control command comprising coding rate information.

11. A computer readable medium comprising a computer program stored in a non-transitory medium that, when executed by a digital processor, causes the processor to perform operations comprising:
encapsulating substreams A, B and C with different importance classes into a single speech frame, wherein the substreams A, B and C are included in a speech service data of CS-domain service data;
mapping the single speech frame onto a single radio bearer (RB);
encapsulating the RB with radio link control (RLC) protocol;
mapping the RLC to a dedicated traffic channel (DTCH); and
mapping the DTCH to an enhanced dedicated channel (E-DCH);
wherein the speech frame comprises: Frame Type, Payload, and Padding, wherein the Frame Type has a fixed length and represents an AMR/AMR-WB coding mode, the payload is a data made up of the concatenated substreams A, B and C, and the padding is a filler bit, when a sum of the frame type and the payload is out of alignment against bytes, several bits are used as a padding to make the whole speech frame aligned against bytes.

12. The computer readable medium of claim 11, wherein the processor further performs an operation of:
sending to a network capability indication information indicating whether a user equipment (UE) supports radio high-speed packet data access channel to bear the CS-domain service data.

13. The computer readable medium of claim 11, wherein the processor further performs an operation of:
mapping the E-DCH to enhanced dedicated physical data channel (E-DPDCH).

14. The computer readable medium of claim 11, wherein the CS-domain service data is one of CS-domain Adaptive Multi-Rate (AMR) speech service data and AMR WideBand (AMR-WB) speech service data.

15. The computer readable medium of claim 11, wherein the processor further performs an operation of:
receiving a mode control command comprising coding rate information.

16. A method for processing circuit switched (CS) domain service data over a radio bearer, wherein the CS-domain service data includes a speech service data comprising substreams A, B, and C with different importance classes, the method comprising:
encapsulating the substreams A, B, and C into a single speech frame;
mapping the speech frame onto a single radio bearer (RB);
encapsulating the RB with radio link control (RLC) protocol;
mapping the RLC to a dedicated traffic channel (DTCH);
mapping the DTCH to an enhanced dedicated channel (E-DCH); and
mapping the E-DCH to an enhanced dedicated physical data channel (E-DPDCH);
wherein the speech frame comprises: Frame Type, Payload, and Padding, wherein the Frame Type has a fixed length and represents an AMR/AMR-WB coding mode, the payload is a data made up of the concatenated substreams A, B and C, and the padding is a filler bit, when a sum of the frame type and the payload is out of alignment against bytes, several bits are used as a padding to make the whole speech frame aligned against bytes.

17. The method of claim 16, wherein importance of the substream A is greater than that of the substream B, and the importance of the substream B is greater than that of the substream C.

18. A user equipment (UE), comprising:
a processor, and
a computer readable medium comprising a computer program stored in a non-transitory medium that, when executed by the processor, causes the processor to:
encapsulate substreams A, B, and C with different importance classes into a single speech frame, wherein the substreams A, B, and C are included in a speech service data of CS-domain service data;
map the speech frame onto a single radio bearer (RB);

encapsulate the RB with radio link control (RLC) protocol;
map the RLC to a dedicated traffic channel (DTCH);
map the DTCH to an enhanced dedicated channel (E-DCH); and
map the E-DCH to an enhanced dedicated physical data channel (E-DPDCH);
wherein the speech frame comprises: Frame Type, Payload, and Padding, wherein the Frame Type has a fixed length and represents an AMR/AMR-WB coding mode, the payload is a data made up of the concatenated substreams A, B and C, and the padding is a filler bit, when a sum of the frame type and the payload is out of alignment against bytes, several bits are used as a padding to make the whole speech frame aligned against bytes.

19. The UE of claim 18, wherein importance of the substream A is greater than that of substream B, and the importance of substream B is greater than that of substream C.

20. A computer readable medium comprising a computer program stored in a non-transitory medium that, when executed by a digital processor, causes the processor to perform operations comprising:
encapsulating substreams A, B, and C with different importance classes into a single speech frame, wherein the substreams A, B, and C are included in a speech service data of CS-domain service data;
mapping the speech onto a single radio bearer (RB);
encapsulating the RB with radio link control (RLC) protocol;
mapping the RLC to a dedicated traffic channel (DTCH);
mapping the DTCH to an enhanced dedicated channel (E-DCH); and
mapping the E-DCH to an enhanced dedicated physical data channel (E-DPDCH);
wherein the speech frame comprises: Frame Type, Payload, and Padding, wherein the Frame Type has a fixed length and represents an AMR/AMR-WB coding mode, the payload is a data made up of the concatenated substreams A, B and C, and the padding is a filler bit, when a sum of the frame type and the payload is out of alignment against bytes, several bits are used as a padding to make the whole speech frame aligned against bytes.

21. The computer readable medium of claim 20, wherein importance of substream A is greater than that of substream B, and the importance of the substream B is greater than that of substream C.

* * * * *